(12) United States Patent
Das et al.

(10) Patent No.: US 12,061,714 B2
(45) Date of Patent: Aug. 13, 2024

(54) SYSTEM AND METHODS FOR DATA ENCRYPTION AND APPLICATION-AGNOSTIC QUERYING OF ENCRYPTED DATA

(71) Applicant: Sotero, Inc., Burlington, MA (US)

(72) Inventors: Purandar Gururaj Das, Lexington, MA (US); Shanthi Boppana, Boxborough, MA (US)

(73) Assignee: Sotero, Inc., Burlington, MA (US)

( * ) Notice: Subject to any disclaimer, the term of this patent is extended or adjusted under 35 U.S.C. 154(b) by 159 days.

(21) Appl. No.: 17/571,744

(22) Filed: Jan. 10, 2022

(65) Prior Publication Data

US 2022/0207172 A1    Jun. 30, 2022

Related U.S. Application Data

(63) Continuation of application No. 17/191,177, filed on Mar. 3, 2021, now Pat. No. 11,222,134.
(Continued)

(51) Int. Cl.
*G06F 21/00* (2013.01)
*G06F 16/2452* (2019.01)
(Continued)

(52) U.S. Cl.
CPC .... *G06F 21/6227* (2013.01); *G06F 16/24526* (2019.01); *G06F 16/248* (2019.01); *G06F 21/602* (2013.01)

(58) Field of Classification Search
CPC . G06F 21/602; G06F 16/24526; G06F 16/248
See application file for complete search history.

(56) References Cited

U.S. PATENT DOCUMENTS 7,783,899 B2    8/2010  Golle et al.
7,783,900 B2 *  8/2010  Hacigumus ....... G06F 16/24561
                                                   380/279
(Continued)

FOREIGN PATENT DOCUMENTS

| EP | 2400424 B1 | 4/2016 |
|----|----|----|
| WO | WO-2021178609 A1 | 9/2021 |
| WO | WO-2023283423 A1 | 1/2023 |

OTHER PUBLICATIONS

Anomaly Detection on Time-Evolving Streams in Real-time. Detecting intrusions (DoS and Ddos attachks), frauds, fake rating anomalies, retrieved on Aug. 8, 2022 at https://github.com/Stream-AD/Mstream (4 total pages).
(Continued)

*Primary Examiner* — Tri M Tran
(74) *Attorney, Agent, or Firm* — Cooley LLP

(57) ABSTRACT

A method for performing data encryption and application-agnostic querying of encrypted data includes identifying, via a processor, selected data for encryption. Encryption is applied to the selected data, to produce encrypted data. A query is received at the processor, the query originating from a software application. The query is translated into a modified query compatible with the encrypted data. The processor causes execution of the modified query, to produce query results. The query results include a subset of the encrypted data. The query results are sent to the software application without decrypting the subset of the encrypted data.

16 Claims, 16 Drawing Sheets

Related U.S. Application Data

(60) Provisional application No. 62/984,978, filed on Mar. 4, 2020.

(51) Int. Cl.
*G06F 16/248* (2019.01)
*G06F 21/60* (2013.01)
*G06F 21/62* (2013.01)

(56) References Cited

U.S. PATENT DOCUMENTS

| | | |
|---|---|---|
| 7,890,774 B2 | 2/2011 | Agrawal et al. |
| 8,429,421 B2 | 4/2013 | Chase et al. |
| 9,047,480 B2 | 6/2015 | Kahol et al. |
| 9,712,495 B2 | 7/2017 | Nagpal et al. |
| 9,805,090 B1 | 10/2017 | Martino et al. |
| 9,875,370 B2 | 1/2018 | Antonopoulos et al. |
| 9,888,032 B2 | 2/2018 | Dekel et al. |
| 9,990,511 B1 | 6/2018 | Dreyfus |
| 10,013,574 B2 | 7/2018 | Hore |
| 10,027,486 B2 | 7/2018 | Liu |
| 10,255,454 B2 | 4/2019 | Kamara et al. |
| 10,496,638 B2 | 12/2019 | Wang et al. |
| 10,528,556 B1 | 1/2020 | Chmil et al. |
| 10,581,812 B2 | 3/2020 | Rohloff et al. |
| 10,609,066 B1 | 3/2020 | Nossik et al. |
| 10,628,587 B2 | 4/2020 | Stepanek et al. |
| 10,789,374 B2 * | 9/2020 | Fujiwara .......... G09C 1/00 |
| 10,885,158 B2 | 1/2021 | Goldwasser et al. |
| 10,984,052 B2 | 4/2021 | Dong et al. |
| 11,025,598 B1 | 6/2021 | Laghaeian et al. |
| 11,038,672 B2 | 6/2021 | Shainski et al. |
| 11,184,149 B2 | 11/2021 | Chakraborty et al. |
| 11,222,134 B2 | 1/2022 | Das et al. |
| 11,501,013 B1 | 11/2022 | Das et al. |
| 2002/0069355 A1 | 6/2002 | Garrison |
| 2003/0101355 A1 | 5/2003 | Mattsson |
| 2004/0193905 A1 | 9/2004 | Lirov et al. |
| 2007/0195960 A1 | 8/2007 | Goldman et al. |
| 2013/0191650 A1 * | 7/2013 | Balakrishnan ...... G06F 21/6227 713/190 |
| 2014/0281512 A1 | 9/2014 | Arasu et al. |
| 2014/0325217 A1 | 10/2014 | Mori et al. |
| 2017/0063888 A1 | 3/2017 | Muddu et al. |
| 2017/0289191 A1 | 10/2017 | Thioux et al. |
| 2017/0329966 A1 | 11/2017 | Koganti et al. |
| 2017/0366568 A1 | 12/2017 | Narasimhan et al. |
| 2018/0248896 A1 | 8/2018 | Challita et al. |
| 2018/0293379 A1 | 10/2018 | Dahan |
| 2019/0102553 A1 | 4/2019 | Herwadkar et al. |
| 2019/0108255 A1 | 4/2019 | Tabak et al. |
| 2019/0109870 A1 | 4/2019 | Bedhapudi et al. |
| 2019/0147170 A1 | 5/2019 | Keselman et al. |
| 2019/0258817 A1 | 8/2019 | Beier et al. |
| 2019/0303575 A1 | 10/2019 | Chelarescu et al. |
| 2020/0036512 A1 | 1/2020 | Vaikuntanathan et al. |
| 2020/0067975 A1 | 2/2020 | Ojha et al. |
| 2020/0084236 A1 | 3/2020 | Kallos et al. |
| 2020/0151356 A1 | 5/2020 | Rohloff et al. |
| 2020/0228308 A1 | 7/2020 | Shainski et al. |
| 2020/0244672 A1 | 7/2020 | Grill et al. |
| 2020/0287936 A1 | 9/2020 | Nguyen |
| 2020/0329066 A1 | 10/2020 | Kirti et al. |
| 2020/0336502 A1 | 10/2020 | Xu et al. |
| 2020/0358799 A1 | 11/2020 | Boyer et al. |
| 2021/0004373 A1 | 1/2021 | Sankaran et al. |
| 2021/0006589 A1 | 1/2021 | Kohout et al. |
| 2021/0019403 A1 | 1/2021 | Mehta et al. |
| 2021/0044603 A1 | 2/2021 | Annen et al. |
| 2021/0117232 A1 | 4/2021 | Sriharsha et al. |
| 2021/0157932 A1 | 5/2021 | Blatt et al. |
| 2021/0160048 A1 | 5/2021 | Blatt et al. |
| 2021/0273958 A1 | 9/2021 | McLean |
| 2023/0033716 A1 | 2/2023 | Das et al. |

OTHER PUBLICATIONS

Bhatia, S., et al., "MSTREAM: Fast Anomaly Detection in Multi-Apsect Streams," WWW'21: Proceedings of the Web Conference (Apr. 19, 2021) (12 total pages).

Curino, C. et al. "Relational Cloud: A Database-as-a-Service for the Cloud." 5th Biennial Conference on Innovative Data Systems Research, CIDR 2011, Jan. 9-12, 2011 Asilomar, California (7 total pages).

International Search Report and Written Opinion issued for International Application No. PCT/US2021/020779, mailed on May 3, 2021.

Popa, et al., "CryptDB: Protecting Confidentiality with Encrypted Query Processing," SOSP '11, (Oct. 23-26, 2011), pp. 85-100.

Wen et al., "PaRQ: A Privacy-Preserving Range Query Scheme Over Encrypted Metering Data for Smart Grid,", IEEE, vol. 1, No. 1, pp. 178-191, doi: 10.1109/TETC.2013.2273889 (Jul. 2013).

Yang et al., "Privacy-Preserving Queries on Encrypted Data," https://www.semanticscholar.org/paper/Privacy-Preserving-Queries-on-Encrypted-Data-Yang-Zhong/684b24117bfa7a93010d386425faa917d9cf3e61 (2006) (17 total pages).

International Preliminary Report on Patentability for International Application No. PCT/US2021/020779, mailed on Sep. 15, 2022, 11 pages.

Chen, L., et al., "Towards resilient machine learning for ransomware detection," May 16, 2019, https://arxiv.org/pdf/1812.09400.pdf, 10 pages.

Co-pending U.S. Appl. No. 18/466,986, inventors Das; Purandar Gururaj and Boppana, Shanthi, filed Sep. 14, 2023.

Fernando, D. W., et al., "A Study on the Evolution of Ransomware Detection Using Machine Learning and Deep Learning Techniques," IoT 2020, 1, 551-604, published Dec. 15, 2020, doi:10.3390/iot1020030.

International Search Report and Written Opinion for International Application No. PCT/US2022/036501, mailed Oct. 17, 2022, 13 pages.

International Search Report and Written Opinion for PCT Application No. PCT/US2023/074132 dated Jan. 2, 2024, 11 pages.

* cited by examiner

SYSTEM AND METHODS FOR DATA ENCRYPTION AND APPLICATION-AGNOSTIC QUERYING OF ENCRYPTED DATA

CROSS-REFERENCE TO RELATED APPLICATIONS

This application is a continuation of U.S. patent application Ser. No. 17/191,177, filed Mar. 3, 2021 and titled "System and Methods for Data Encryption and Application-Agnostic Querying of Encrypted Data," which claims priority to and the benefit of U.S. Provisional Patent Application No. 62/984,978, titled "System and Methods for Data Encryption and Application-Agnostic Querying of Encrypted Data," filed Mar. 4, 2021, the disclosures of which are hereby incorporated by reference in their entireties.

TECHNICAL FIELD

This disclosure relates generally to the encryption of data, and more specifically, to the processing of queries for data that has been encrypted.

BACKGROUND

Encryption has emerged as an important tool in securing sensitive data and other assets. Organizations are increasingly adopting encryption. Several data protection and privacy standards, such as the General Data Protection Regulation (GDPR), now require encryption of the sensitive data.

SUMMARY

In some embodiments, a method for performing data encryption and application-agnostic querying of encrypted data includes identifying, via a processor, selected data for encryption. Encryption is applied to the selected data, to produce encrypted data. A query is received at the processor, the query originating from a software application (also referred to herein as an "application"). The query is translated into a modified query compatible with the encrypted data. The processor causes execution of the modified query, to produce query results. The query results include a subset of the encrypted data. The query results are sent to the software application without decrypting the subset of the encrypted data and/or without re-encrypting the subset of the encrypted data.

In some embodiments, a non-transitory, processor-readable medium stores processor-readable instructions. The instructions include instructions to cause a processor to identify selected data for encryption, and apply encryption to the selected data, to produce encrypted data. The instructions also include instructions to cause the processor to receive a query originating from a software application, and translate the query into a modified query compatible with the encrypted data. The instructions also include instructions to cause the processor to cause execution of the modified query, to produce query results, and to send the query results to the software application without decrypting the subset of the encrypted data and/or without re-encrypting the subset of the encrypted data. The query results include a subset of the encrypted data.

DETAILED DESCRIPTION

Figure 1:
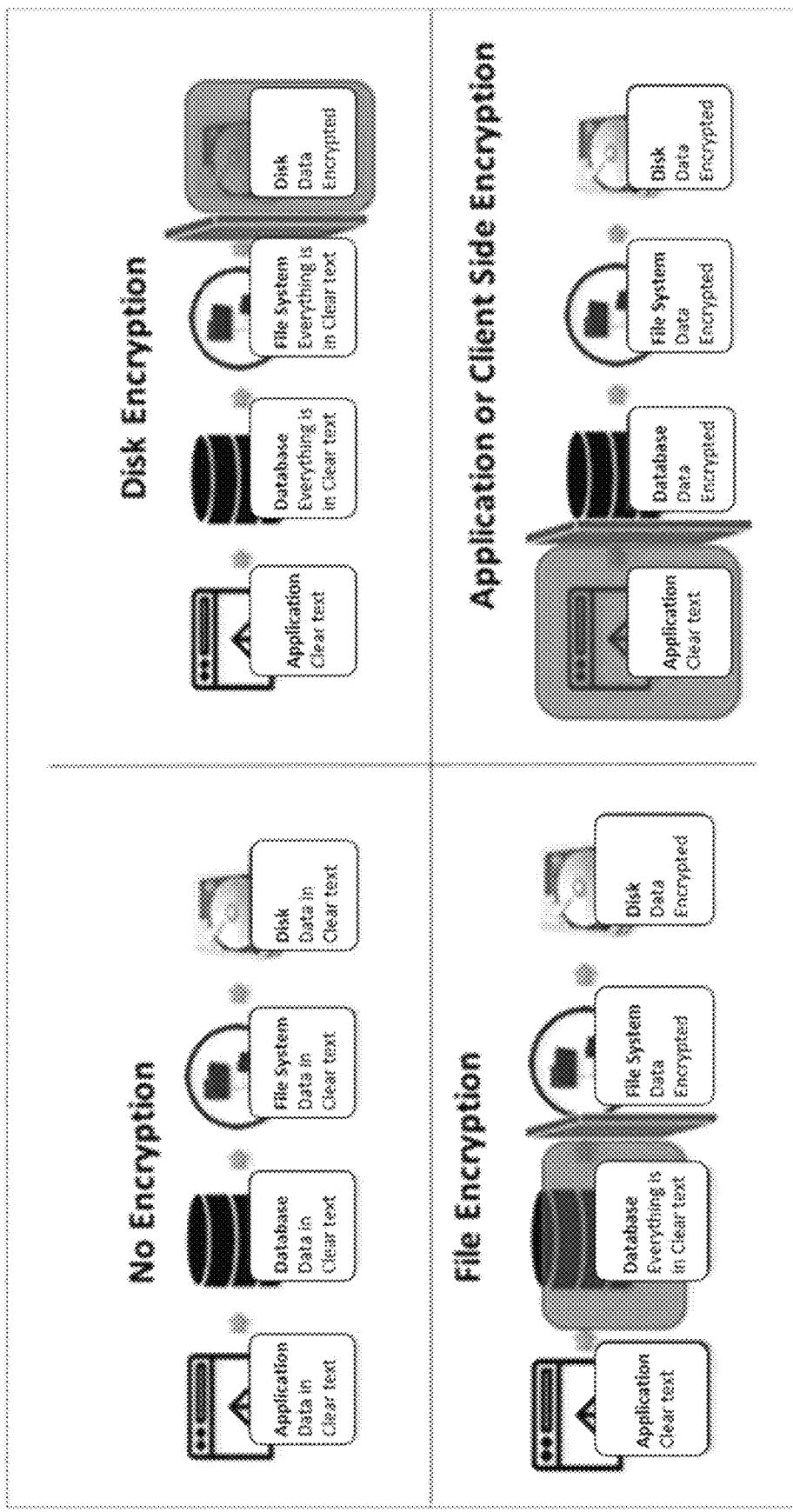
FIG. 1 is a chart showing the drawbacks associated with known disk encryption techniques, file encryption techniques, application or client-side encryption techniques, and no encryption.

Data (particularly sensitive data) is more valuable than ever, for example since an increasing variety of data types are attractive to hackers (e.g., financial data, healthcare data, passwords, etc.). A value chain exists for the sale, purchase and trading of hacked data, while technological changes such as increased external and internal connectivity to computer networks, have been making data more vulnerable.

Security infrastructures increasingly incorporate multi-layer security to protect data and assets. Layers within such security systems can include, for example, perimeter security and data protection through encryption. These layers offer certain benefits, but also have their limitations. For example, perimeter security is typically implemented for a network by securing all entry points to the network (e.g., by requiring authentication of users and/or assigning permission levels to users). A firewall can provide additional security by monitoring data packets transmitted to and from the network. Perimeter security can be vulnerable, however, for several reasons. First, given the increasingly open nature of modern network architectures, the number of connection points to secure can become unwieldy. Second, network security products can have inherent weaknesses that are exploitable by hackers. Third, legitimate users can be lax in protecting their identities and passwords. Fourth, perimeter security does not address threats associated with internal users, who may deliberately or unintentionally misuse data.

Data encryption converts data from a first form into a second, modified form (or code) based on a conversion rule. The conversion rule is driven by a key, called an encryption key. The encryption key can, in turn, be used to decrypt or convert encrypted data back into its first/original form (called plaintext). Non-administrator users typically do not access the encryption key. Rather, the encryption system automatically encrypts the data (e.g., in response to determining that the user is an authorized user).

Full disk encryption (FDE) tools can be used to encrypt an entirety of a persistent storage device, such as a hard drive, including the boot sector of the persistent storage device. FDE can be performed using an encryption key (e.g., that was generated with the system install). Although full disk encryption ensures that a hacker cannot read the disk contents via physical access (and, thus, is useful for protecting devices such as laptops, phones and portable disks containing sensitive data), an encrypted disk remains prone to unlimited accesses once an endpoint is connected to the disk via a network. A hacker or an internal user, within the network, can access everything on an encrypted disk that is connected to the network.

File-level encryption tools can be used for encrypting selected directories and folders on an endpoint. Unique keys can be assigned for different folders/directories, allowing different users to access separate encrypted folders/directories on the same endpoint. Column level encryption is a type of database encryption method that allows the selection of specific information or attributes to be encrypted instead of encrypting the entire database file. File-level encryption and column level encryption can include the creation of multiple levels of users, each with its own level of access providing greater security. File-level encryption and/or column level encryption can be preferable to full disk encryption, however, as is the case with disk encryption, the data must be unencrypted and stored in memory for processing, at which point it is vulnerable to hackers. In other words, file-level encryption and column level encryption can create a secure perimeter around selected data, but this security does not extend to the data "in use."

With application-level encryption, data is encrypted within the application itself as the data is generated or processed, and before the data is committed and stored at the database level. Application-level encryption creates a secure perimeter around data, potentially both when the data is at rest and when the data is in motion. Application-level encryption can be built into an application, or implemented as a security level (e.g., using a third-party agent). Application-level encryption can be viewed as preferable to full disk encryption and file-level encryption, however there are several limitations to application-level encryption. First, organizations typically use a variety of different types of applications, from legacy home grown applications to modern Software as a Service (SaaS) applications. It may be difficult or not possible to identify an application-level encryption solution that works across all applications of the organization. Second, data is typically accessed by a large number of end points and by a variety of applications (e.g., analytics, reporting, and visualization tools such as SAS or Tableau). Partner application programming interfaces (APIs) and other data transfer methods also access data. Application level security cannot secure all of these disparate end points for all of these purposes. Third, application-level encryption is a relatively young technology that is estimated not to mature for another 3-5 years.

Transparent Data Encryption (TDE) protects data while "at rest," but requires data to be decrypted prior to use, and to remain decrypted for the duration of their use. A disadvantage of TDE is that managed relational database services (RDS) do not allow access to the database server or the database kernel, limiting its use to dedicated database deployments. TDE requires database level integrations, leading to support and technology (database) specific challenges.

Tokenization is a process in which an external service generates encrypted tokens that are then persisted. Limitations with tokenization are scale, complexity of application integration and the inability to query the tokenized data.

In systems employing any one of the encryption types discussed above, the data must generally be available in its original, unencrypted form for processing. As such, when data is modified, manipulated or queried (e.g., when existing data or an existing database needs to be updated, or a query is to be run), the data needs to be in its unencrypted form. Suppose, for example, that a user desires to select all records, within a database, that include a patient name of "Joe." Both the data and the results may initially be encrypted. To perform the user's desired action, each record of the database must be analyzed to determine whether "Joe" appears in the patient name field. Such analysis, using known techniques, is performed on unencrypted data.

In the cases of full disk encryption and file-level encryption, encrypted data is loaded into memory during use, at which point the plaintext data is fully exposed. Application-level encryption protects data in memory for some select applications, but cannot protect every access point. These vulnerabilities can be attractive for exploitation by hackers. Indeed, many data breaches involve the targeting of vulnerable data when that vulnerable data is "in-use."

A chart showing the drawbacks associated with FDE, file-level encryption, application-level encryption, and no encryption, is provided at FIG. 1. As shown in FIG. 1, when no encryption is used within a computerized system, data is not encrypted at any level (whether application, database, file system, or disk). At every level, the data is in "clear text" or plaintext, exposing the data to a variety of vulnerability threats. When disk encryption is used (e.g., native encryption solutions, built into backup, storage media and volume level encryption), data is in clear text at each of the application, database, and file system levels, since only the disk data is encrypted. Disk encryption addresses a limited set of threats, and does not protect from malicious insiders or external attackers. When file encryption is used, data is in clear text at each of the application and database levels, but file system and disk-level data are encrypted. With file encryption, logged-in users can still access the clear text data (which may be sensitive). Moreover, file encryption only encrypts columns or tables of the database(s), leaving configuration files and/or log files exposed and vulnerable. Typically, a file encryption solution offered by one database vendor cannot be applied to (or used for) databases from other vendors. Data encrypted using file encryption must be decrypted for use. Searches, matching, and run operations cannot be performed on the encrypted data while it is encrypted. File encryption is inadequate for addressing security concerns across heterogeneous environments. When application encryption (or client side encryption) is used, according to known techniques, data is in clear text at the application level, and encryption and decryption occur within the application. To implement application encryption, development effort and resources are needed to apply encryption and decryption methodologies, as well as algorithms to handle querying of encrypted data without losing functionality. All applications accessing data need to be made encryption-aware, and data must be decrypted for use. Searches, matching, and run operations cannot be performed on the encrypted data while it is encrypted. Application encryption is inadequate for addressing security concerns across heterogeneous environments.

Embodiments set forth herein describe "smart encryption" processes that prevent data losses while overcoming the various drawbacks of known encryption methods described above. Smart encryptors set forth herein can accomplish data protection by encrypting data (e.g., using an encryption key, optionally with automated key rotation) and making the encrypted data available, via a dedicated encrypted data repository, for use by a variety of software applications without decryption or other modification of the encrypted data (optionally implemented via a single platform). As such, the smart encryptors and smart encryption processes set forth herein can eliminate the need to decrypt data when that data is in-use, protecting the data regardless of whether it is stored within a secured computer network or in a remote platform (e.g., a cloud computing system ("the cloud")), and whether it is being accessed by users internal to, or external to, a given computer network. Table 1, below, contrasts FDE with the smart encryption approach set forth herein, according to some embodiments.

tion be changed (e.g., rotated) periodically, for example at predetermined times or intervals of time. Automated key rotation can also be used as a tool to further protect data in the event that an encryption key is lost or stolen.

In some embodiments, a smart encryption method includes a single encryption event (e.g., using AES-256K encryption, client-specific encryption mechanisms, etc.), and storage of the encrypted data in a dedicated repository. As such, smart encryption systems set forth herein provide a single point of access to, and thus enhanced control of, sensitive data, as contrasted with known encryption schemes. Smart encryption systems can also be configured to provide functionality for data migration, database administration, transaction logging and activity monitoring capabilities.

In some embodiments, software applications can use encrypted data, generated via smart encryption, while the encrypted data remains in a secure, encrypted state. In addition, smart encryption can be deployed in a non-intrusive way, eliminates server side software, does not require modifications to software applications, and stages (i.e., makes available for use) the encrypted data so that it can be queried. Smart encryptors set forth herein can inspect transactions involving encrypted data and/or occurring within the smart encryption system, and implement passive security measures and/or active security measures, for example to detect real-time threats associated with the encrypted data. Alternatively or in addition, smart encryptors set forth herein can track accesses and usage of encrypted data and/or unencrypted data. Alternatively or in addition, smart encryptors set forth herein can prevent the execution of malicious

TABLE 1

Comparison of FDE and Smart Encryption

| | Full Disk Encryption | Smart Encryption |
| --- | --- | --- |
| Encryption | Data written to disk | Granular capability. Schema & data. Selective application to schema objects and columns. Comprehensive flexibility. |
| Not Included | Database data and schema are not encrypted. All data is in plaintext when the system is up and running | |
| Threats Addressed | Disk copying and/or media loss | Disk/data copying, media theft, direct access to the database, sql injection, application hacks, network breaches, password hacks, brute force access attempts, ability to filter potentially questionable activity such as bulk downloads, bulk copies |
| Exposure | Any network infiltration or breach. Application access. Direct Database Access, SQL injection etc. | Coordinated insider compromise |
| Complexity | Low | Low |
| Platform Coverage | Specific to the disk and not portable across data storage platforms | Broad Coverage, simple product for cross platform coverage. Application technology agnostic. |
| Encryption States Addressed | "At rest" | "At rest", "In use", "In transit" (e.g., movement or transmission, "access") |
| Deployment Effort | Low | Low |
| Application | Typically for smaller, standalone devices | Enterprise wide deployment and coordinated management |
| Advanced Threat detection & Prevention | Not Applicable | Automated preventive analysis of each transaction and categorization of access requests. Ability to stop flagged requests. Consolidation of information across all instrumented platforms |

As used herein, "automated key rotation" refers to the ability to change the key used for data encryption. In some embodiments, a security policy can require that the encrypattacks with the smart encryption system. Smart encryption technology can be implemented in software, hardware, or a combination thereof. When implemented at least partially in software, the software (including processor-executable instructions, or "code") can reside locally, from the vantage point of an end user (e.g., within a compute device of a wired or wireless local area network), and/or can reside remote from the end user(s) (e.g., within a compute device accessible by the end user(s) via a remote compute device local to the end user(s).

Figure 2:
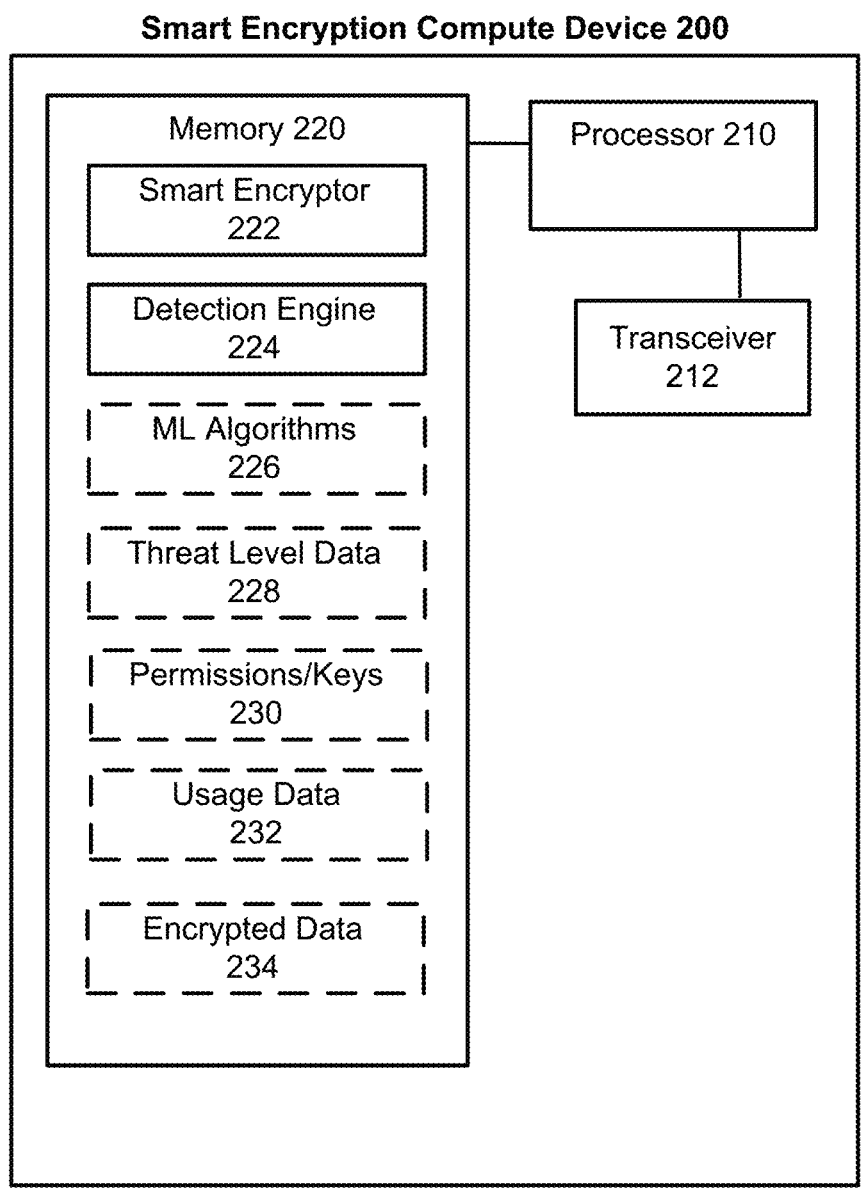
FIG. 2 is a diagram of a smart encryption compute device, according to some embodiments.

FIG. 2 is a diagram of a smart encryption compute device 200, according to some embodiments. As shown in FIG. 2, the smart encryption compute device 200 includes a processor 210 operably coupled to a memory 220 storing data and/or instructions, executable by the processor 210, to accomplish methods set forth herein. For example, the memory 220 stores a smart encryptor 222, a detection engine 224, and optionally one or more of: machine learning (ML) algorithms 226, threat data 228, permissions (e.g., access levels, credentials (user names, passwords), encryption keys) 230, usage data 232 and/or encrypted data 234. The processor 210 is also operably coupled to a transceiver 212 (i.e., electronics including a transmitter and a receiver) for communicating with one or more other compute devices (remote from and/or in wired or wireless communication with the smart encryption compute device 200). For example, the smart encryption compute device 200 can receive a query request referencing data pre-encryption data associated with the encrypted data 234. The smart encryption compute device 200 can, via the smart encryptor 222, modify the received query into a modified query that references encrypted data 234 associated with the pre-encryption data referenced by the received query, and execute the query against the encrypted data 234 without decrypting any of the encrypted data 234. Although shown as optionally included in the smart encryption compute device 200, in some implementations the encrypted data is at least partially stored in a dedicated repository operably coupled to, but remote from, the smart encryption compute device 200. Although shown and described, with reference to FIG. 2, as a compute device ("smart encryption compute device 200"), smart encryption functionality can also be implemented, alternatively or in addition, as software (e.g., a software program or driver that is installed on one or more compute devices of a user's network). In other words, smart encryption can be performed using software, hardware, firmware, or any combination thereof.

Figure 3:
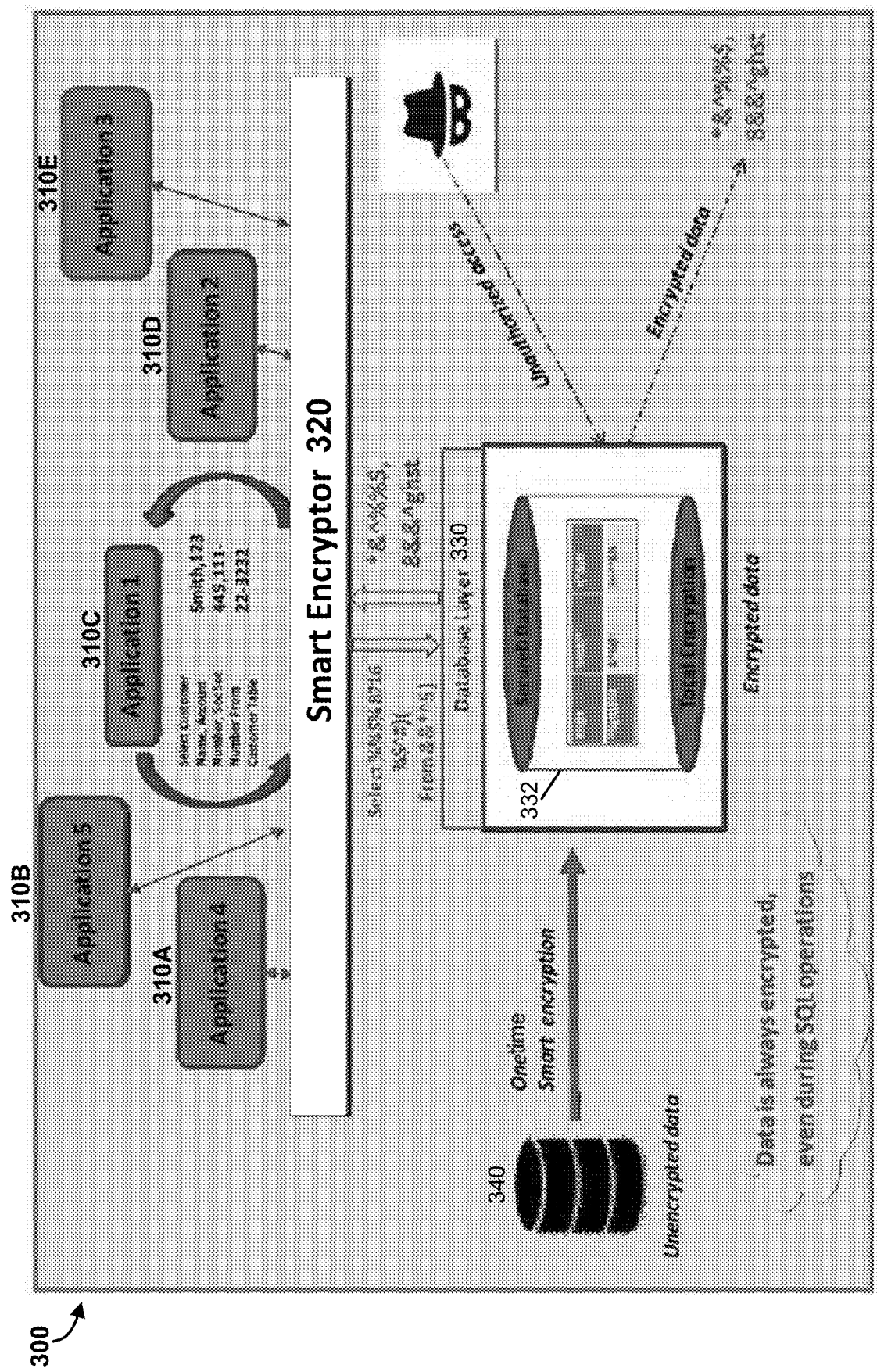
FIG. 3 is a diagram of a first smart encryption system, according to some embodiments.

FIG. 3 is a diagram of a first smart encryption system 300, according to some embodiments. As shown in FIG. 3, the smart encryption system 300 includes a smart encryptor 320 that operates between one or more software applications (e.g., Applications 1 through 5—310A through 310E) and a database driver (also referred to as a "data access interface"). The smart encryptor 320 (e.g., similar to the smart encryption compute device 200 of FIG. 2) is operably coupled to a smart encryptor database 332 via a database layer 330. The smart encryptor database 332 can include one or more primary tables that store encrypted data generated by the smart encryptor 320. The encrypted data can be generated by the smart encryptor 320 a single time, and subsequently used without the need to modify the applications (310A through 310E). Pre-encryption data that is processed and encrypted by the smart encryptor 320 can include unencrypted data 340 that is stored locally to, or remotely from but accessible by, the smart encryptor 320. During operation, one or more of the applications (310A through 310E) makes a data request, and the smart encryptor 320 facilitates execution of the requests without decrypting the encrypted data in the smart encryptor database 332 at all. All SQL and data processing operations can be performed on the encrypted data, eliminating the need for constant encryption and decryption.

Consider again the example above, in which a user desires to select all records specifying the patient name "Joe." Using smart encryption, there is no need to encrypt the data to perform the user's requested action. Each record of the database (e.g., smart encryptor database 332 of FIG. 3) will be analyzed to determine whether that record includes an encrypted representation of the name "Joe" (e.g., a string of characters), the rather than the unencrypted name "Joe." During this process, neither the data itself nor the results are decrypted. As such, nowhere in the smart encryption system of FIG. 3—not in the hard drives and not in the memory—is the data ever available in plaintext, thus providing increased data security.

In some embodiments, to implement smart encryption, each data file is encrypted a single time. Once each data file has been encrypted, the plaintext data can be archived and/or stored in a secure storage location (e.g., having relatively few access points). Each field is encrypted, using one or more encryption standards, such that a full range of SQL operations (e.g., sums, selects, reorder, combine) can be performed. Each subset from a plurality of subsets of the data can be encrypted using multiple different encryption standards. For example, encryption standards for each data subset can be selected based on the data type(s), the data values, and/or a desired performance metric for an organization. For example, a first encryption standard may be employed when encrypting "name" data, and a second encryption standard different from the first encryption standard may be employed when encrypting "date of birth" data.

In some embodiments, smart encryption is "universal," in that it is compatible for use with all applications, APIs and other data query tools, and is application technology agnostic. Smart encryption is applied directly to data, and protects the data during processing. Smart encryption can support all native data store functions, making application access to critical data seamless (i.e., without detracting from usability of data and applications). Smart encryption can also work with most application data repositories, including Oracle, SQL Server, MySQL, PostgreSQL (Postgres), MongoDB & Hadoop. Smart encryption can be deployed in RDS databases. Smart encryption satisfies the requirements of security standards such as GDPR, Health Insurance Portability and Accountability Act (HIPAA), and The Payment Card Industry Data Security Standard (PCI DSS). Smart encryption can also be used to leverage cloud storage resources. Many organizations avoid using cloud resources, despite their relatively low cost, due to data security concerns (e.g., the inability of cloud systems to secure all pathways connected to the cloud systems). Smart encryption facilitates the use of cloud environments for the storage of sensitive data since only the encrypted data is stored, thereby mitigating or avoiding security risks to the original data. Smart encryption can be used for all data within a networked system, or for a subset of the data within the networked system (e.g., the most valuable data and/or the most vulnerable data).

In some embodiments, smart encryption is employed, within a networked system of compute devices, together with one or more additional encryption technologies (e.g., FDE, file-level encryption, column level encryption and/or application-level encryption) to achieve multi-layer data security.

In some embodiments, a smart encryptor performs anomaly detection for data loss prevention (DLP) (e.g., deterministic DLP and/or predictive DLP). For example, a smart encryption process can include monitoring data queries and performing anomaly detection based on the monitored data queries.

In some embodiments, a smart encryption system facilitates comprehensive operational security for applications, with strong data encryption. Data is secured using encryption, and the encrypted data can be transacted or queried using one or more algorithms. In effect, the typical weak point of data being vulnerable during use is eliminated. Smart encryption protects data, both at rest and in use, for use by a software application without modifications to the software application. For example, encrypted data can be stored in a dedicated data repository, and requests issued by the software application and be directed to the dedicated data repository.

Figure 4:
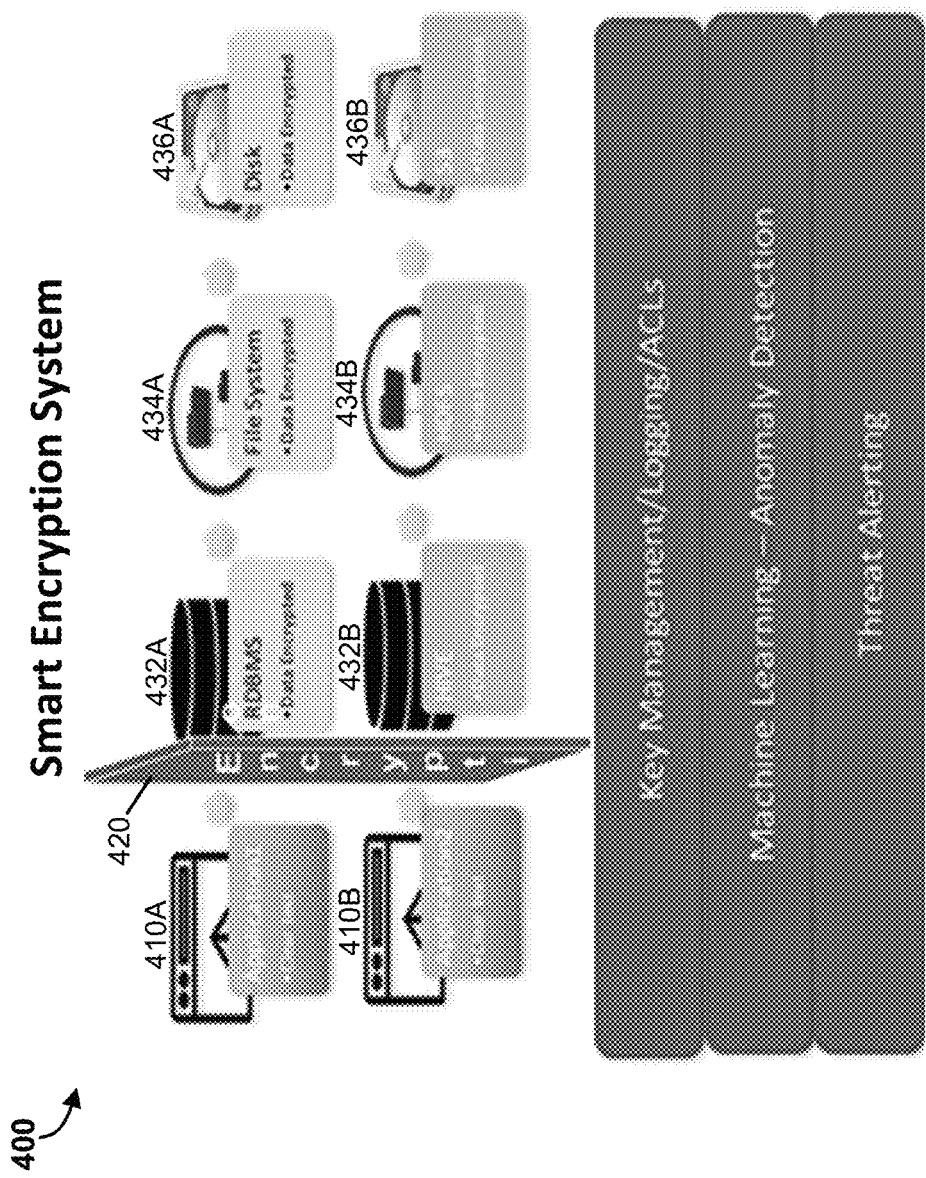
FIG. 4 is a diagram of a second smart encryption system, according to some embodiments.

FIG. 4 is a diagram of a second smart encryption system 400, according to some embodiments. As shown in FIG. 4, the smart encryption system 400 includes a single smart encryptor 420 that can receive and process requests received from at least two different software applications (Application1 410A and Application2 410B), without modifications begin made to either of Application1 410A or Application2 410B, and without decrypting any of the already-encrypted data, and by accessing a variety of different types of encrypted data storage. For example, the smart encryptor 420 can receive and process a request received from Application1 410A using encrypted data in one of more of a relational database management system (RDBMS) 432A, a file system 434A, and a disk storage 436A. Similarly, the smart encryptor 420 can receive and process a request received from Application2 410B using encrypted data in one of more of an Apache Hive data warehouse 432B, a Hadoop Distributed File System (HDFS) 434B, and an Amazon S3 storage 436B. As also shown in FIG. 4, the smart encryptor 420 can be configured to manage encryption keys and access control lists (ACLs) and log accesses and/or usage of encrypted data (optionally storing such tracking data as "usage data" in memory 220 of the smart encryption compute device 200 shown in FIG. 2). The smart encryptor 420 can also be configured to perform anomaly detection, using one or more machine learning models/algorithms, based on the tracking data, and to perform threat alerting based on the anomaly detection.

Figure 5:
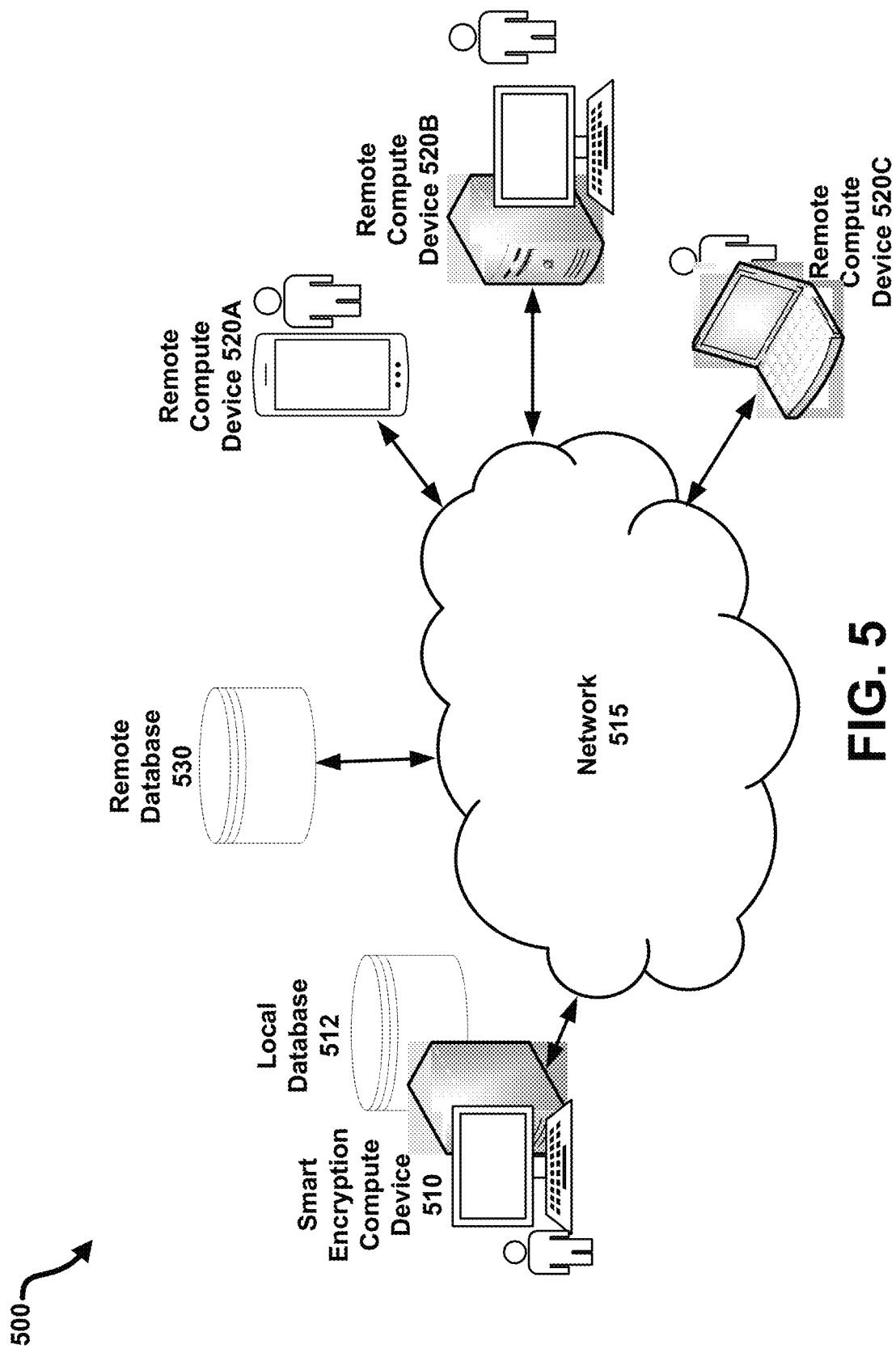
FIG. 5 is a diagram showing a networked system for performing smart encryption, according to some embodiments.

FIG. 5 is a diagram showing a networked system for performing smart encryption, according to some embodiments. As shown in FIG. 5, the smart encryption system 500 includes a smart encryption compute device 510 (e.g., similar to the smart encryption compute device 200 of FIG. 2) with a local database 512. The smart encryption compute device 510 can communicate with a remote database 530 and with multiple different remote compute devices (e.g., mobile device/smartphone 520A, desktop computer 520B, and laptop 520C) via a wired or wireless network 515.

Figure 6:
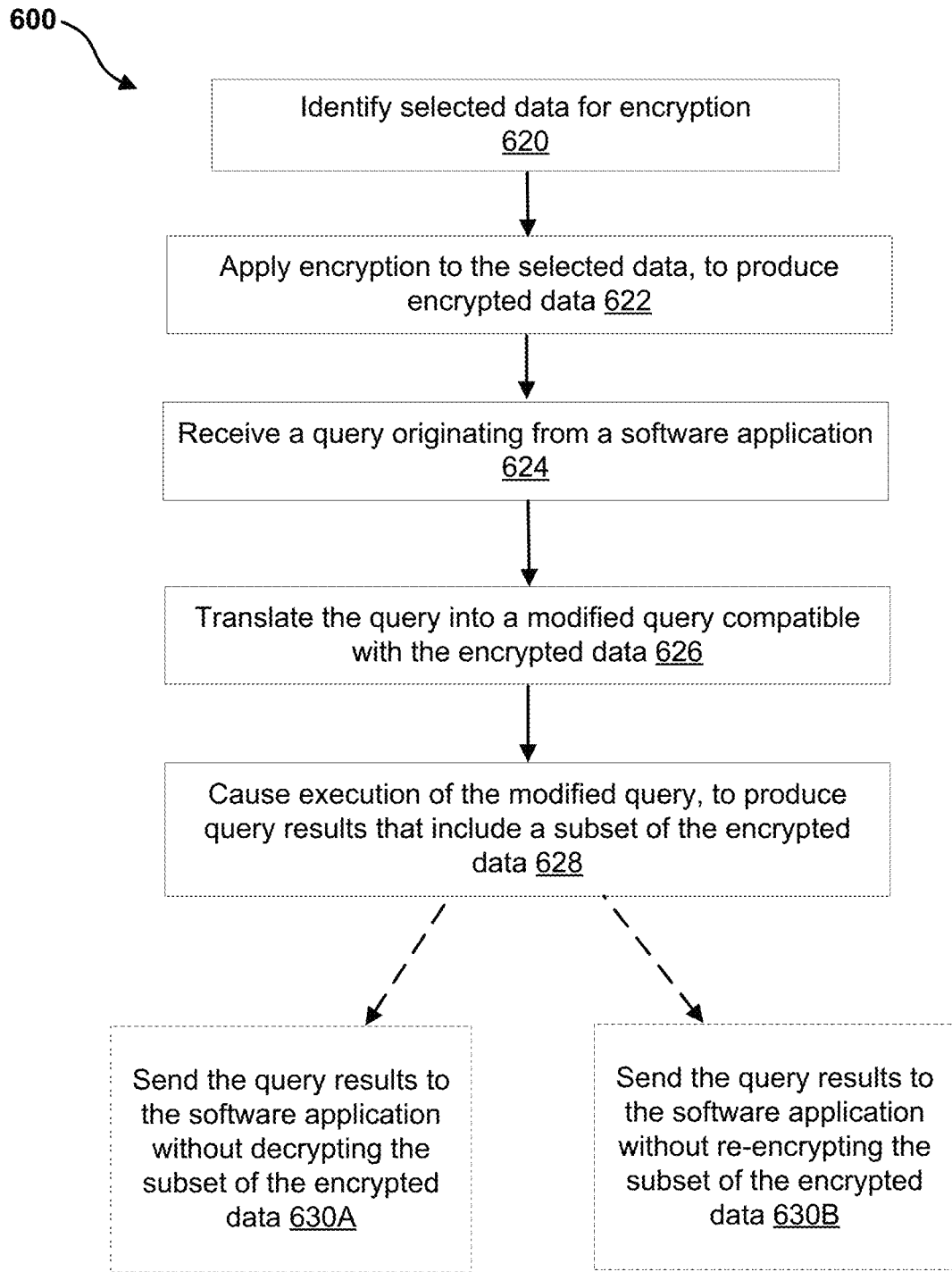
FIG. 6 is a flowchart showing a method for performing smart encryption, according to some embodiments.

FIG. 6 is a flowchart showing a method for performing smart encryption, according to some embodiments. The method 600 of FIG. 6 can be performed, for example, using the smart encryption compute device 200 of FIG. 2, the smart encryptor 320 of FIG. 3, the smart encryptor 420 of FIG. 4, or the smart encryption system 500 of FIG. 5. As shown in FIG. 6, the method 600 includes, at 620, identifying selected data for encryption. Identifying the selected data for encryption can include detecting tagged data within a data repository accessible by the smart encryption compute device. At 622, encryption is applied to the selected data, to produce encrypted data. The encryption can be one or more of: a deterministic encryption, an order-preserving encryption, or a numeric encryption. At 624, a query is received, originating from a software application (running remotely or locally). The query can include, for example, a LIKE operator and/or a range query. The query is translated, at 626, into a modified query that is compatible with the encrypted data. The smart encryption compute device causes execution of the modified query, at 628, to produce query results that include a subset of the encrypted data. The execution of the modified query at 628 can include generating a token based on the query originating from the software application. At 630A, the query results are sent to the software application without decrypting the subset of the encrypted data. At 630B, the query results are sent to the software application without decrypting the subset of the encrypted data. In some implementations, the query results are sent meeting the conditions of each of 630A and 630B.

In some embodiments, the software application sending the query at 624 is a first software application, the query received at 624 is a first query, the modified query generated at 626 is a first modified query, the query results obtained at 628 are first query results, and the subset of the encrypted data is a first subset of the encrypted data. The method 600 can further include receiving a second query, from a second software application different from the first software application, and translating the second query into a second modified query that is compatible with the encrypted data. The smart encryption compute device can cause execution of the second modified query, to produce second query results that include a second subset of the encrypted data (e.g., different from the first subset of the encrypted data). The second query results can be sent to the second software application without decrypting the second subset of the encrypted data and/or without decrypting the second subset of the encrypted data.

Figure 7A:
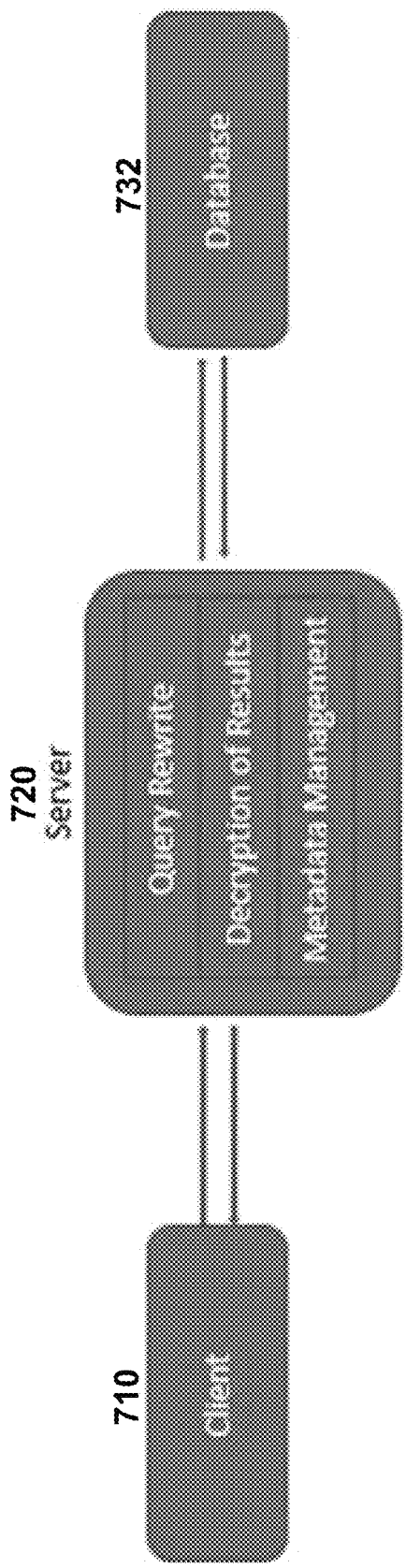
FIGS. 7A-7B are diagrams of a query transaction flow, according to some embodiments.
Figure 7B:
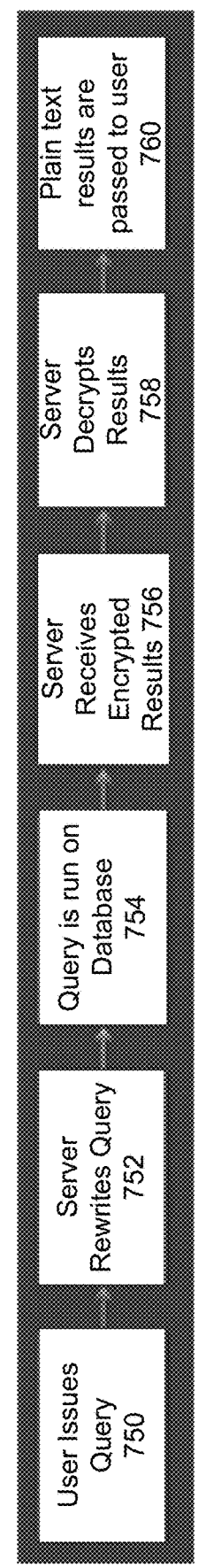

FIGS. 7A-7B are diagrams of a query transaction flow, according to some embodiments. During processing of a query, the query is received at or intercepted by the smart encryption system, translated by the smart encryption system, submitted for execution, and the query result set is optionally decrypted. As shown in FIG. 7A, a centralized server 720 (e.g., the smart encryption compute device 200 of FIG. 2, the smart encryptor 320 of FIG. 3, the smart encryptor 420 of FIG. 4, or the smart encryption system 500 of FIG. 5) can receive a query request from a client compute device 710 and rewrite the query into a modified query, which the server 720 then uses to query the database 732 containing encrypted data. The results of the query received at the server 720 may be decrypted at the server before being returned to the client 710 (optionally in a re-encrypted form). The server 720 is also configured to perform metadata management (e.g., storing historical query data to facilitate faster query processing when duplicate or similar requests/queries are subsequently received). Metadata management can include query optimization or access optimization, for improved performance of the smart encryption system. FIG. 7B shows a similar process, in which a used issues a query at 750, the server (e.g., server 720) rewrites the query at 752, and runs the rewritten query at 754. The server received encrypted query results at 756, and decrypts them at 758 before providing the plaintext results to the requesting user/client (760).

Figure 8:
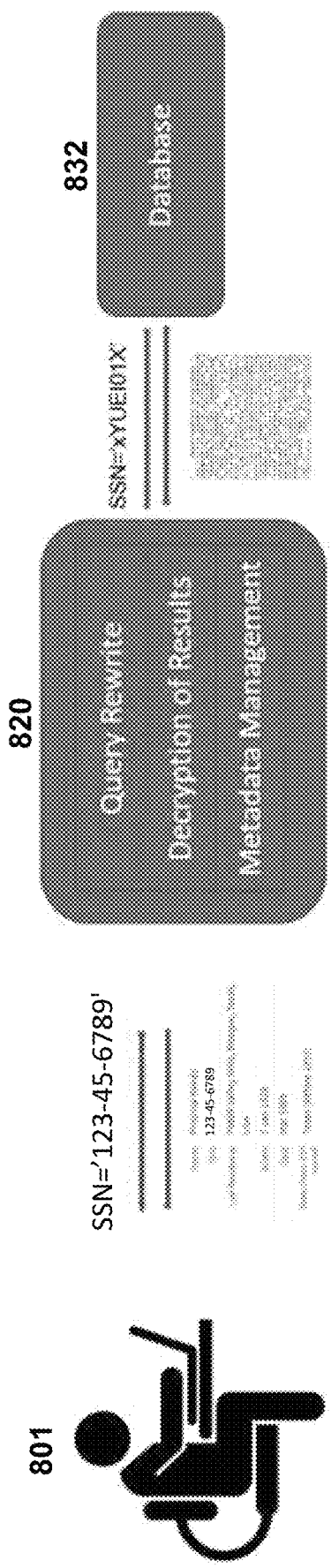
FIG. 8 shows a diagram of an equality operation on a server of a smart encryption system, according to some embodiments.

FIG. 8 shows a diagram of an equality operation on a server of a smart encryption system, according to some embodiments. As shown in FIG. 8, a centralized compute device 820 (e.g., the smart encryption compute device 200 of FIG. 2, the smart encryptor 320 of FIG. 3, the smart encryptor 420 of FIG. 4, or the smart encryption system 500 of FIG. 5) receives a request/query from a compute device of a user 801. The query ("SSN='123-45-6789'") requests all data records for which the social security number (SSN) is equal to "123-45-6789." The compute device 820 rewrites the query into a modified query, which the compute device 820 then uses to query the database 832 containing encrypted data, without decrypting any data. The results of the query received at the compute device 820 are decrypted by the compute device 820 before being returned to the compute device of the user 801 (either in plaintext or in a re-encrypted form).

In some embodiments, a smart encryption system is configured to execute search patterns on, and detect pattern matches within, fully encrypted data (i.e., without full or partial decryption, and without data masking) without compromising security. For example, the smart encryption system can use encrypted ngrams to perform pattern searches. A secondary table (also referred to herein as an "index lookup table") can be generated/constructed on the server of the smart encryption system. The secondary table can include a plurality of records, each record from the plurality of records including data for multiple fields (associated with one another via their co-location within a common record). The fields can include (but are not limited to): table name ("Tablename"), column name ("column_name"), encrypted string value ("encrypted_string_value"), and encrypted ngrams. During population of the secondary table, Ngrams are computed, each ngram is encrypted, and the data is indexed. Table 2, below, shows ngrams for an example social security number "123456789."

TABLE 2 ngrams for SSN string 123456789:

| ngram | value | Stored encrypted value |
|---|---|---|
| 1-gram | 1 2 3 4 5 6 7 8 9 | Xgc4oRv4ZGPRJreY6ofBUA==<br>FhABMkk8ZwCCSMx2M1zGSQ==<br>FWaT0d7UeVnzjN4N8PjBXQ==<br>8EDboKdyiQioarGQvv1Sdw==<br>uyBHZdmSCBdYMCFxuydDaA== |
| 2-gram | 12 23 34 45 56 67 78 89 | kYv6cJXCYUbFZKQblWXimw==<br>JkR8VoYIBSF0L5PL7hnNQQ==<br>BTm2WhwT3vSREr0hCxWVhQ==<br>ydHB6SCaFL1BRmSJAPu0QA==<br>T7m5JUCjrKGWcwzQfr2ySg==<br>ox1tPCRGBrfaXYsPsk3TVw==<br>yMhCNmyp4XmB4a8imv+MEQ== |
| 3-gram | 123 234 345 456 567 678 789 | kKpLCk1O3RJzlSN7TTEDUw==<br>GpU0vL4bQdJ3RfrDB5Omvw==<br>iZyZCMBNRLuBD8Ozi0vYWw==<br>MUVGcGMyITGhy0159tVkSQ==<br>VzF7Akx/4VLjzoJxKhYCkg==<br>7H0EKk6r1pkfhpsQZ4/elA==<br>5EYEuWXAFO4D0a7Uh+jH2A== |
| 4-gram | 1234 2345 3456 4567 5678 6789 | JA7XzwWios2GFUDHMTCUmA==<br>/DnVrNsGYJFZsvwKtIusjg==<br>lVjLi1XeKTEMODZ1sy7wBg==<br>yeY35h7tsGHobjgZgzvYDQ==<br>4DOIm3NujEXLMV6j93krcw==<br>4rlDaDxNzVQcEzZ/6nhhPg== |
| 5-gram | 12345 23456 34567 45678 56789 | VGN7eYrAdhAHRbezpayw2Q==<br>ig37SkXDNUls8vE7D2oLHQ==<br>bprPGgpSBbSp6kq2Fi+Elw==<br>Z1uQmqDBLd9wHBI+YXiZ0A==<br>H5+79jHzKegRedMl/yUS2Q== |
| 6-gram | 123456 234567 345678 456789 | zsD/lKpq/gCk2zBFj50VbA==<br>wsiIoZn39piVKZq7xuLmYA==<br>G2EPvCU0w1BA7oKCX2aPPA==<br>oAhbMDb+7PhSyZQMXPyt8Q== |

TABLE 2-continued ngrams for SSN string 123456789:

| ngram | value | Stored encrypted value |
|---|---|---|
| 7-gram | 1234567 2345678 3456789 | Lw7BiVoZPNiKMRCrmDCBOg==<br>yLpTSpP4gA0SysLIULxWWw==<br>kdH+x0gFdsxM+ZM1rud1CA== |
| 8-gram | 12345678 23456789 | BsIzuQgsEeMm4yW4roUjPg==<br>uFFjJj0FJuPG2lPw8TRPeA== |

In some embodiments, a smart encryption system is configured to process queries using a LIKE operator on the encrypted data, for example in response to a signal received from a software application, the signal representing a query or query request (e.g., an SQL statement). A "LIKE" query refers to an access request that performs comparisons of either the full string or a subset of the string. As strings of encrypted data are loaded into a column of the secondary table (wherein the column is configured for LIKE query support, in that, for example, a particular value or attribute in the column is used for comparative analysis, e.g., "return all values that have 'at' in the string"), ngrams can be calculated for the incoming strings. Each ngram is then (optionally) encrypted. In some implementations, the encrypted data is populated into both the primary table (e.g., of the smart encryption database of FIG. 3) and the secondary table (index lookup table). The query is then parsed to identify a pattern of interest, and to detect the presence of a LIKE operator. The query is then rewritten, by the smart encryptor, to define a modified query that includes a custom_match function call (e.g., "custom_match"), in response to detecting the presence of the LIKE operator and/or based on an affirmative determination that the relevant column(s) of the secondary table are configured to support LIKE queries. The modified query can then be executed against the encrypted data of the secondary table (and/or the primary table). The custom_match function can receive, as parameters, an encrypted_string_value ("encrypted_string_value") and a generated token, and perform a lookup in the secondary table based on (e.g., referencing) the encrypted_string_value, to retrieve ngram cipher text. The custom_match function can then search for a search pattern of interest in the ngram cipher text (e.g., leveraging bilinear maps).

Figure 9A:
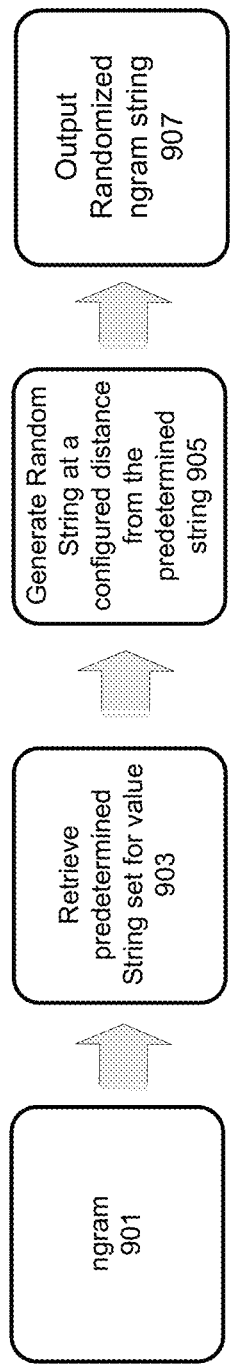
FIG. 9A shows a process for generating randomized strings for ngrams, according to some embodiments.

In some embodiments, a smart encryption system is configured to generate randomized strings for ngrams. As shown in FIG. 9A, a process for generating randomized strings for ngrams can begin with an ngram (e.g., generated by splitting received strings of encrypted data into pluralities of ngrams), at 901, the ngram having an associated value. A predetermined string set for a given ngram value can be retrieved, at 903, and one or more randomized ngram strings can be generated at 905, at a configured/predetermined distance from the predetermined string. The randomized ngram string can then be output, at 907. Optionally, cipher text is computed for the randomized ngram strings and stored in memory. Alternatively or in addition, the smart encryption system can be configured to generate tokens for search patterns. For example, given an incoming search pattern, one or more search tokens can be generated using a private key.

Figure 9B:
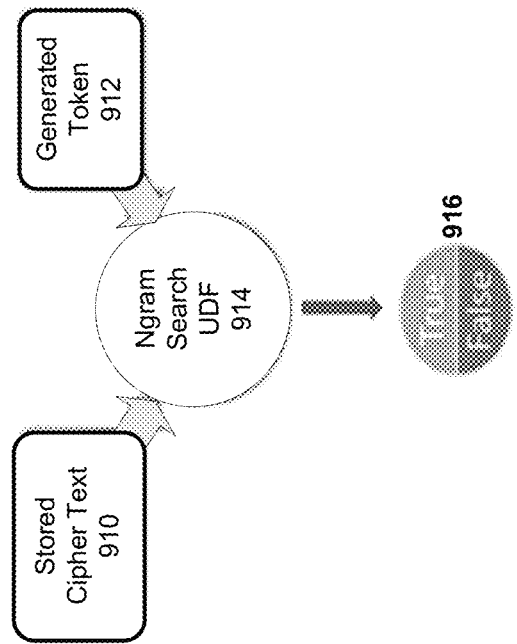
FIG. 9B is a flow chart showing an example ngram search process, according to some embodiments.

FIG. 9B is a flow chart showing an example ngram search process. As shown in FIG. 9B, stored cipher text 910 and a generated token 912 for a search pattern are received and processed by an ngram search user-defined function (UDF)

914, to determine, at 916, whether a match is identified ("true") or no match is identified ("false").

As an example, a social security number (SSN) column of a secondary table ("tablex") can be configured for LIKE query support. Given an original query, containing an insertion command, as follows: "insert into tablex (firstname, ssn) values('John', '123456789')," the original query can be rewritten as a modified query as shown below:

Insert into tablex (firstname, ssn) Values('/QSI3IFE1DsbLPLDGeNUrg==','qn/DCK/pLBwghb2Mp9KamW==');

Insert into indexlookup(tablename, columnname, encrypted_string_value_id, ngrams) values ('tablex', 'ssn','qn/DCK/pLBwghd2Mp9kAMw==', Xgc4oRv4ZGPRJreY6ofBUA== FhABMkk8ZwCCSMx2M1zGSQ==FWaT0d7UeV-nzjN4N8PjBXQ==8EDboKdyiQioarGQvv1Sdw== uyBHZdmSCBdYMCfxuy dDaA==kYv6cJXCYUbFZKQbIWXimw== JkR8VoYIBSF0L5PL7hnNQQ==BTm2VVh-wT3vSREr0hCxWVhQ==ydHB6SCaFL1BR-mSJAPu0QA==T7m5JUCjrKGWcwzQfr2ySg== ox1tPCRGBrfaXYsPsk3TVw== yMhCNmyp4XmB4a8imv+MEQ kKpLCk1O3RJzISN7TTEDUw== GpU0vL4bQdJ3RfrDB5Omvw== iZyZCMBNRLuBD8Ozi0vYWw== MUVGcGMyITGhy0159tVkSQ==VzF7Akx/4VLjzoJxKhYCkg==7HOEKk6r1pkfhpsQZ4/eIA==5EYEuWXAFO4D0a7Uh+ jH2A==JA7Xzwios2GFUDHMTCUmA==/DnVrNsGYJFZsvwKtlusjg== IVjLi1XeKTEMODZ1sy7wBg== yeY35h7tsGHobjgZgzvYDQ== 4DOIm3NujEXLMV6j93krcw== 4rIDaDxNzVQcEzZ/6nhhPg==VGN7eYrAdhAHRbezpayw2Q== ig37SkXDNUIs8vE7D2oLHQ== bprPGgpSBbSp6kq2Fi+ Elw==Z1uQmqDBLd9wHBI+YXiZ0A==H5+ 79jHzKegRedMI/yUS2Q==zsD/IKpq/gCk2zBFj50VbA==wsiloZn39piVKZq7-xuLmYA==G2EPvCU0w1BA7oKCX2aPPA== oAhbMDb+7PhSyZQMXPyt8Q== Lw7BiVoZPNiKMRCrmDCBOg== yLpTSpP4gA0SysLIULxVVWw==kdH+x0gFdsxM+ ZM1rud1CA==BsIzuQgsEeMm4yW4roUjPg== uFFjJj0FJuPG2IPw8TRPeA==')

As another example, given an original query as follows: "select * from tablex where firstname='John' and SSN like '%577%'," the original query can be rewritten as a modified query, as follows: "select * from tablex where firstname='/QSI31FE1DsbLPLDGeNUrg==' and custom_match(ssn, 'iZyZCMBNRLuBD8Ozi0vYWw==')=1." The custom_match function can then receive, as parameters:

ssn-'qn/DCK/pLBwghd2Mp9kAMw=='
match_pattern-,'iZyZCMBNRLuBD8Ozi0vYWw=='

The custom_match function looks up the received ssn value in the index lookup table (indexlookup) and retrieves the associated ngrams. The custom_match function then performs a search for 'iZyZCMBNRLuBD8Ozi0vYWw==' within the retrieved ngrams. If the pattern is found, the custom_match function returns a value of "1." Otherwise, the custom_match function returns a value of "0."

Figure 10:
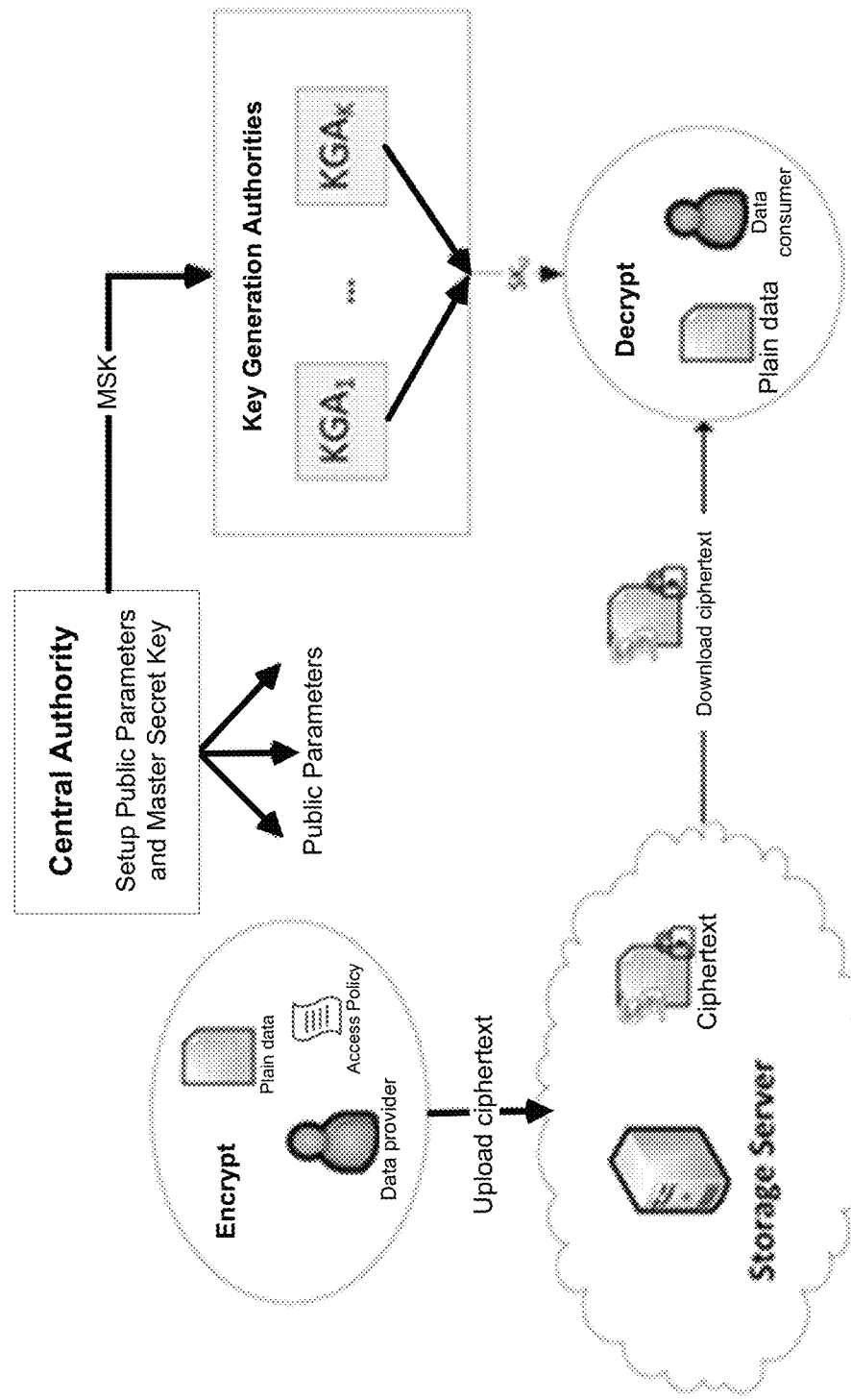
FIG. 10 shows a system for performing attribute-based cipher text policy encryption, according to some embodiments.
Figure 11:
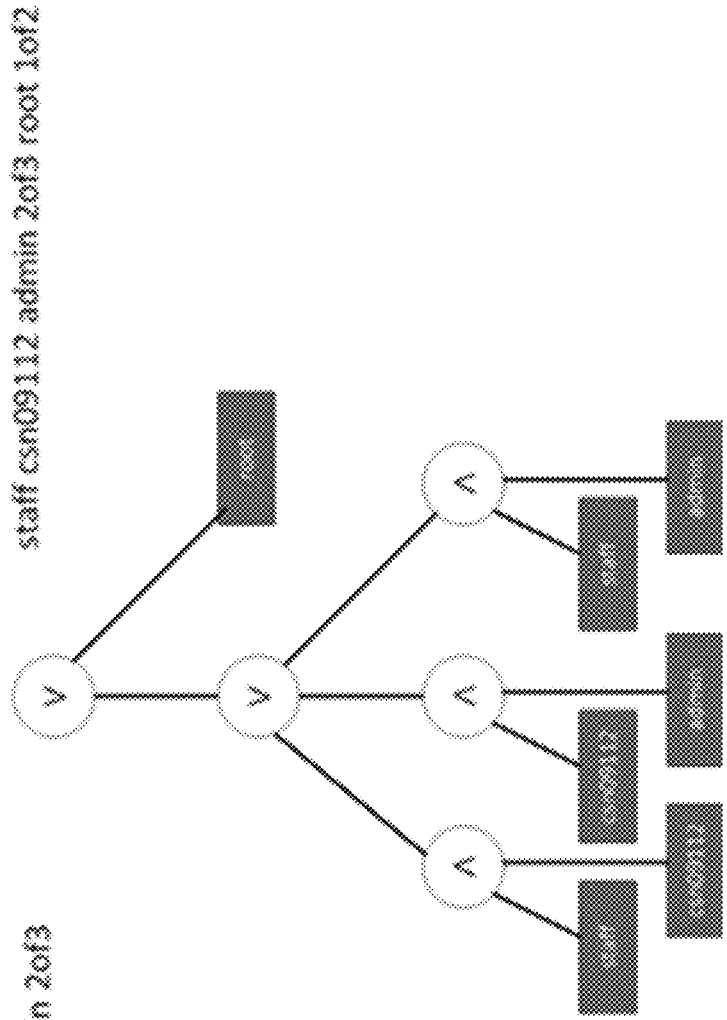
FIG. 11 is a diagram showing an example access policy, according to some embodiments.
Figure 11:
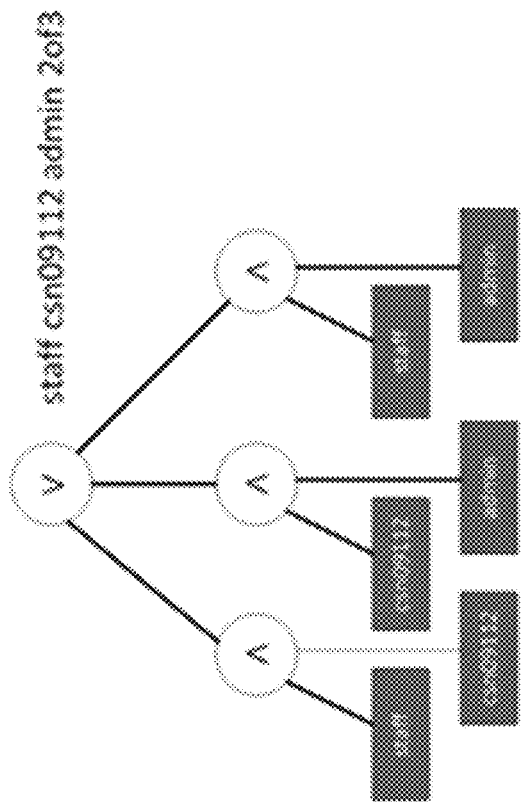

FIG. 10 shows a system for performing attribute-based cipher text policy encryption. During attribute-based cipher text policy encryption, an access policy is embedded in cipher text (e.g., computed for randomized ngram strings), and messages are decrypted only if incoming user key attributes match the access policy embedded in the cipher text. The system of FIG. 10 is implemented using public key cryptography, such that a pair of keys (one secret, one public) is required for encryption. An example access policy, compatible with the system of FIG. 10, is shown in FIG. 11. As used herein, "Access policy" refers to a set of rules that assign privileges to users or groups of users ("roles"). As shown in FIG. 11, the "root" refers to a super user or administrator of the system that has access to all privileges and can assign/modify privileges of other users and roles (e.g., "staff").

In some embodiments, attribute-based encryption (ABE) is adapted to include the ngram search capability. For example, an access policy can be constructed using randomized ngrams as attributes of the access policy. A rule can be created, specifying that at least one ngram should match to return a value of true or "1." A token can then be generated, with a search pattern set as an attribute of the token. A custom UDF can be created that takes, as inputs, cipher text (with the access policy) and the token (with the search pattern as an attribute). The custom UDF compares the access policy of the cipher text with the search pattern of the token, to identify matches and/or similarities therebetween (e.g., based on levenshtein distance).

Figure 12:
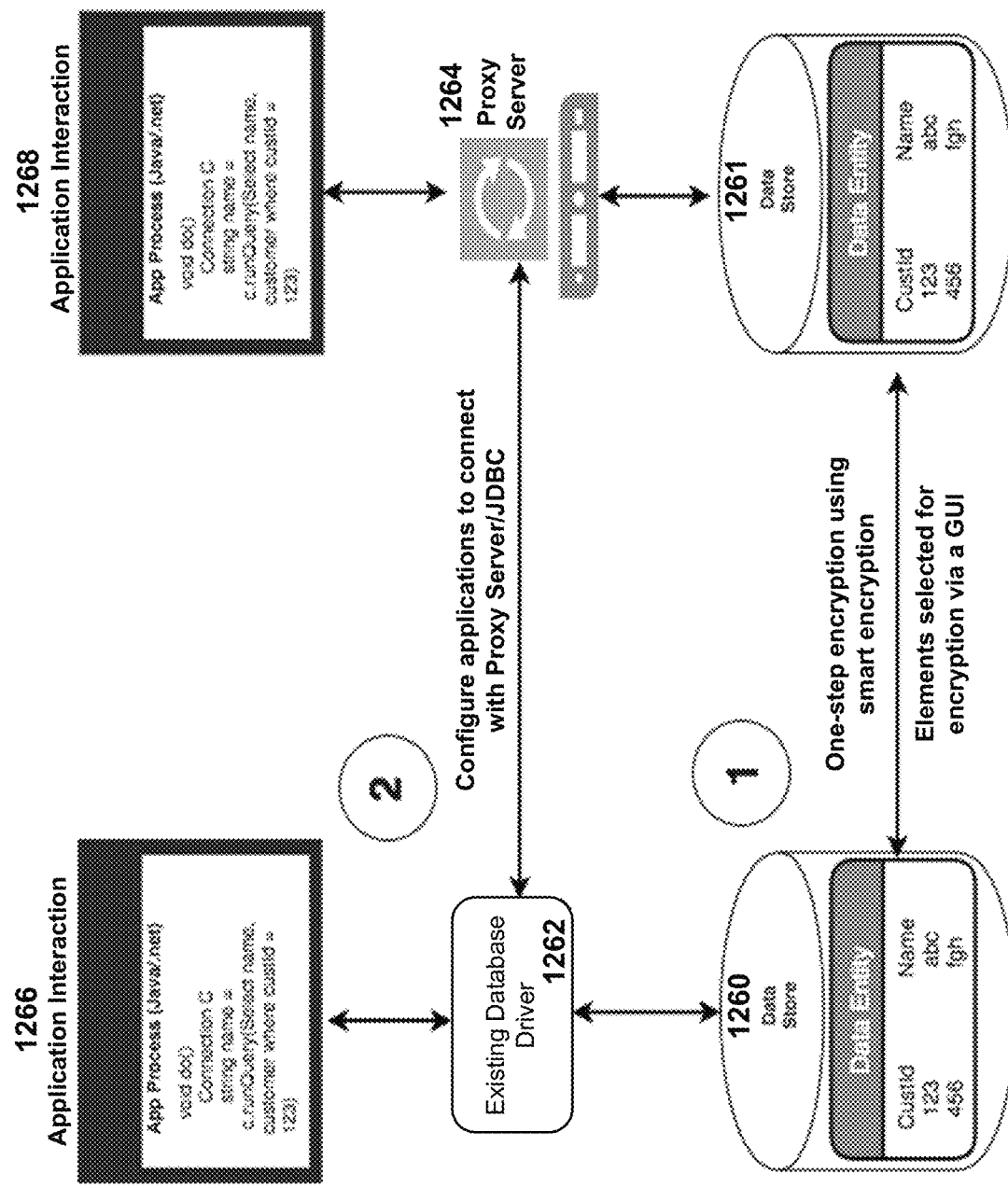
FIG. 12 is a diagram showing an example implementation of the smart encryption system, according to some embodiments.

FIG. 12 is a diagram showing an example implementation of the smart encryption system, according to some embodiments. As shown in FIG. 12, during an initial step (marked "1"), data elements within one or both of data stores 1260 and 1261 are selected, by a user (e.g., an administrator), via a user interface (e.g., a graphical user interface (GUI) of a smart encryption compute device such as smart encryption compute device 510 of FIG. 5) for encryption. The selected data is encrypted, in a single step and according to smart encryption methods set forth herein. The encrypted data is stored in data store 1261 for later access. A software application 1266 may interact with an existing database driver 1262, for example to access plaintext data within the data store 1260. The software application 1266 can be configured to connect with a proxy server 1264 and/or a JDBC driver, via the existing database driver 1262, such that requests from the software application 1266 referencing data that has been encrypted can be processed by the proxy server 1264 and/or the JDBC driver without modification to the original request or to the software application 1266. Alternatively or in addition, the software application 1268 can be configured to connect directly to the proxy server 1264, such that requests from the software application 1268 referencing data that has been encrypted can be processed by the proxy server 1264 without modification to the original request or to the software application 1268.

Figure 13:
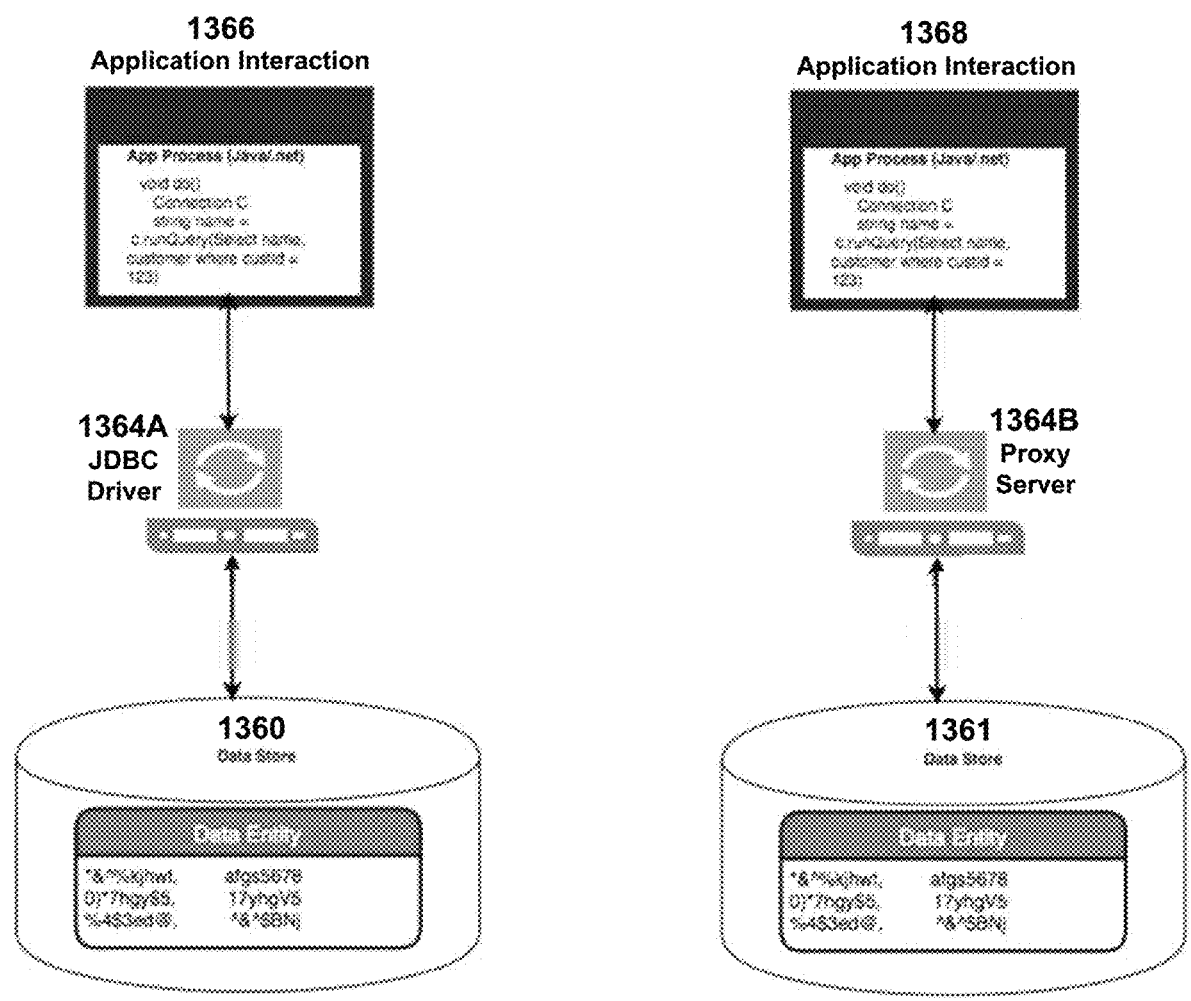
FIG. 13 is a diagram showing deployment models for smart encryption systems, according to some embodiments.

FIG. 13 is a diagram showing deployment models for smart encryption systems, according to some embodiments. Deployment #1 is implemented on an application server or database server, and includes a lightweight JDBC driver 1364A, without the need for a separate server. The software application 1366 can perform operations on encrypted data in the data store 1360 via the JDBC driver 1364A. Deployment #2 is a scalable implementation that includes a proxy server 1364B, with cross-database driver connectivity (e.g., ODBC, JDBC, proxy). The software application 1368 can perform operations on encrypted data in the data store 1361 via the proxy server 1364B.

Figure 14:
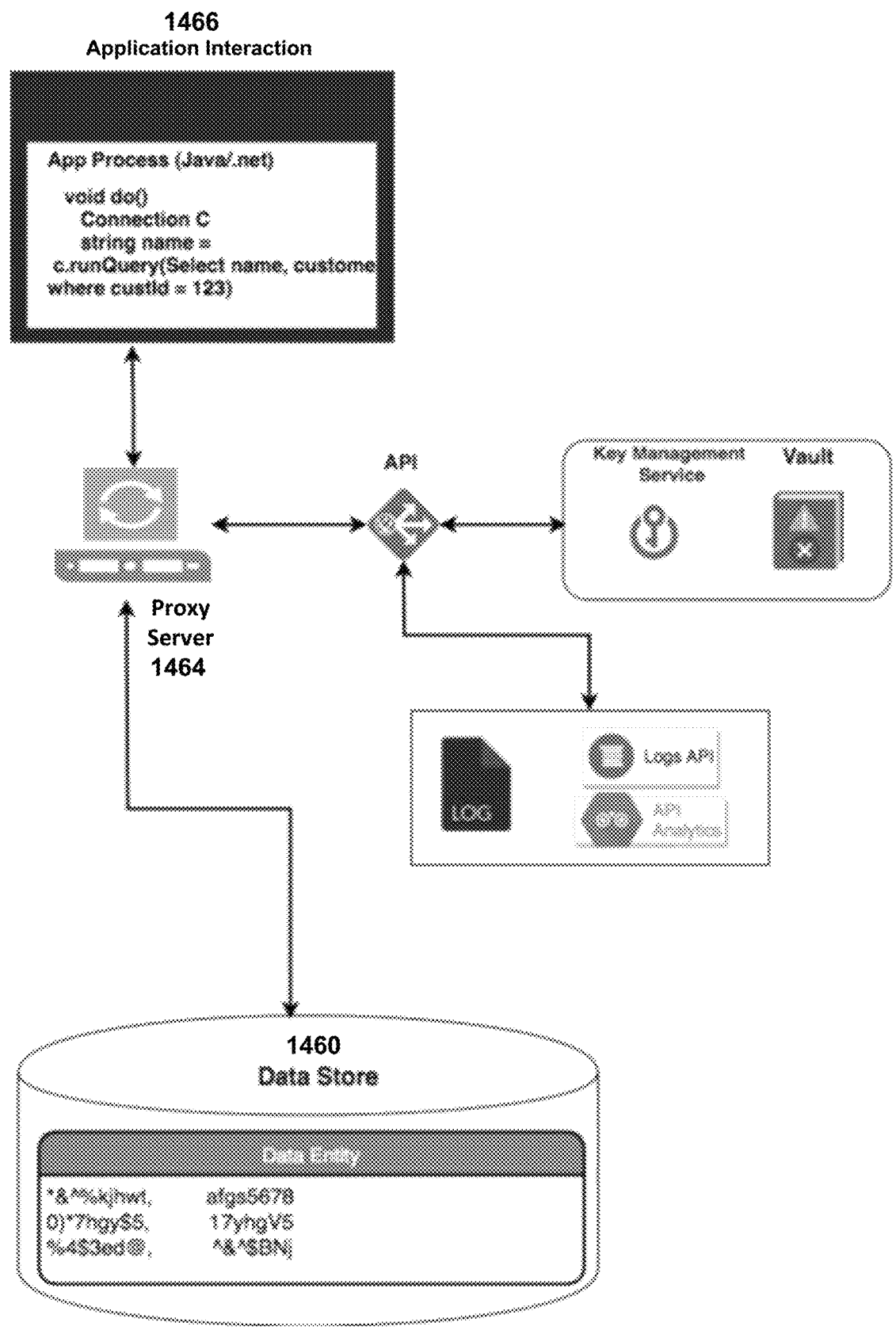
FIG. 14 is a diagram showing software application interaction with a smart encryption system, according to some embodiments.

FIG. 14 is a diagram showing interaction of a software application 1466 with a smart encryption system, according to some embodiments. As shown in FIG. 14, smart encryption operates (at proxy server 1464) between one or more software applications 1466 and a data store 1460 containing smart-encrypted data, for example by receiving data requests and/or queries from the software application 1466 and executing them using the data store 1460. The smart encryption can proceed without any change to the data requests, without modifications to the software application, and without the need for server-side software. The proxy server 1464 can communicate with an application programming interface (API) to log the processing of data requests and/or to validate requests received at the proxy server 1464 from the software application 1466, for example based on a key management policy. The "vault" depicted in FIG. 14 can be a secure store within, or operably coupled to, the smart encryption system. Encryption keys can be stored securely within the vault, with limited access to one or more administrators.

Figure 15:
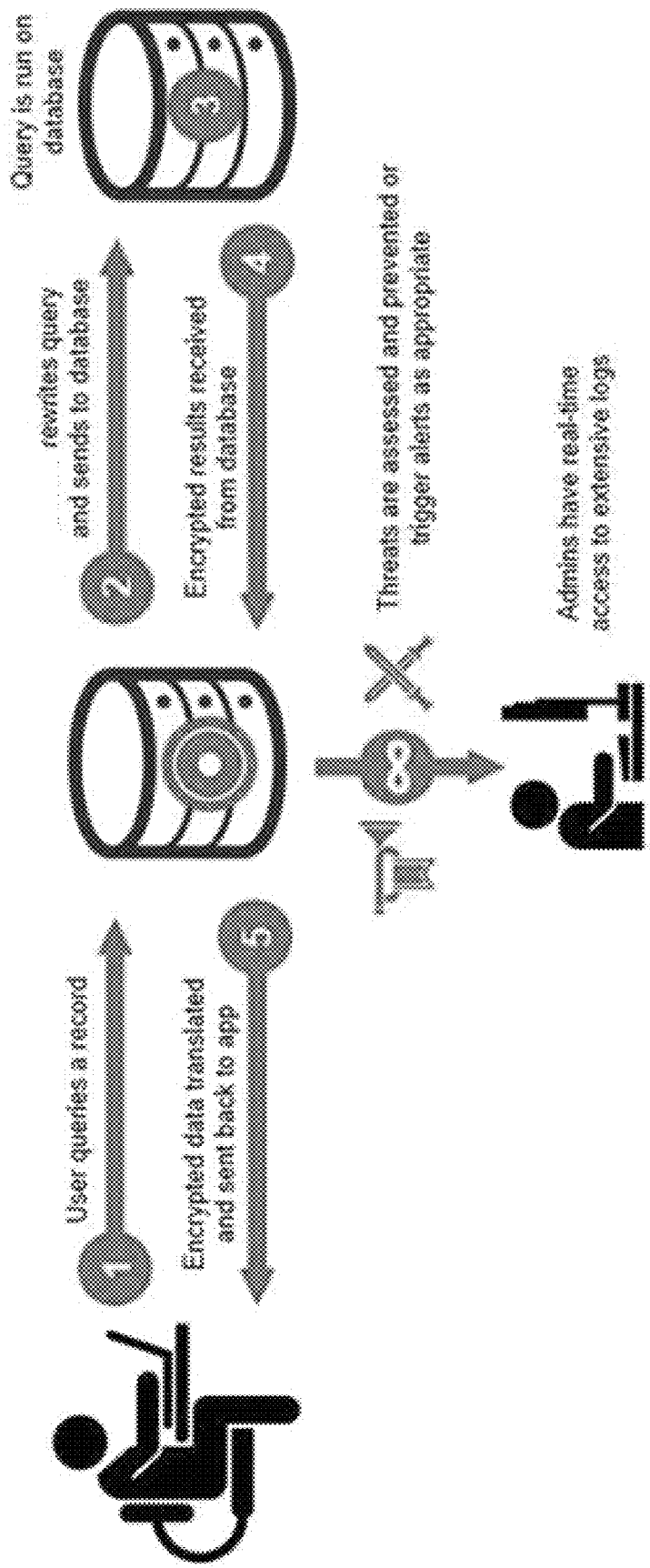
FIG. 15 is a diagram showing query operations via a smart encryption system, according to some embodiments.

FIG. 15 is a diagram showing query operations via a smart encryption system, according to some embodiments. As shown in FIG. 15, at step "1," a user submits a query, via a software application, for one or more records to the smart encryption system. At step "2," the smart encryption system rewrites the query and sends it to the database storing encrypted data (i.e., transmits the rewritten query to a compute device operably coupled to the database, for execution at step "3," or executes the rewritten query directly against the database at step "3"). At step "4," a response to the rewritten query, containing encrypted results, is returned to the smart encryption system. At step "5," the encrypted results are translated/decrypted and sent/transmitted back to the requesting software application. While steps 1 through 5 are being performed, the smart encryption system can actively monitor signals passing through (i.e., received and sent via) the smart encryption system to one or more of: log data (e.g., related to requests, requesters, software applications that submit requests, results/responses, etc.), assess threats, detect anomalies, generate and send alerts (e.g., based on and in response to detected threats or anomalies), and/or take remedial measures, such as blocking one or more transmissions of data in response to detecting an unauthorized user of the smart encryption system. The smart encryption system can also be configured to render, e.g., via a GUI, a real-time display of smart encryption operations and logs as they are generated, historical logs, etc.

Figure 16:
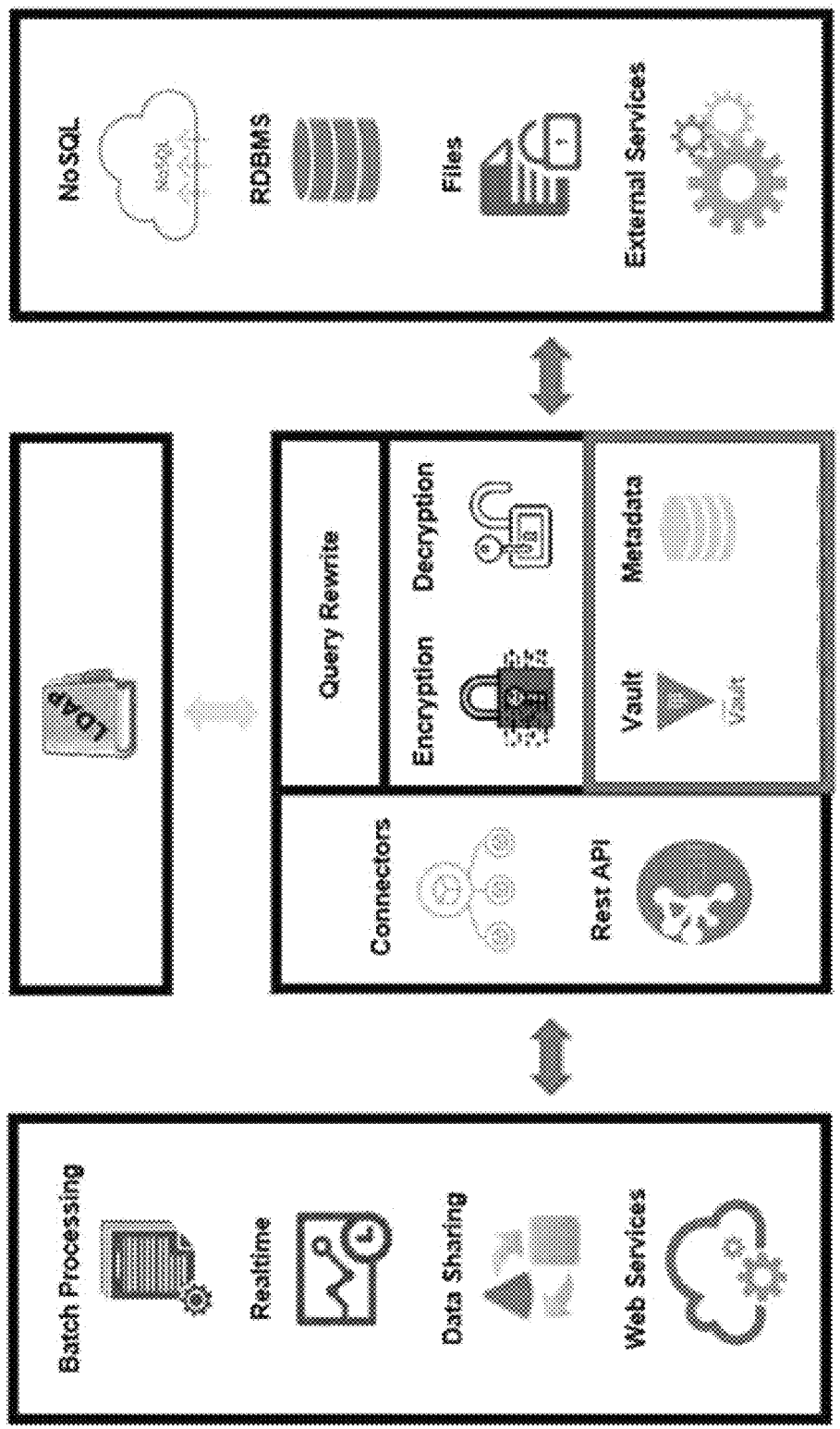
FIG. 16 is a diagram showing services accessible by and performed by a smart encryption system, according to some embodiments.

FIG. 16 is a diagram showing services accessible by and performed by a smart encryption system, according to some embodiments. As shown in FIG. 16, a centralized smart encryption system can include data encryption and decryption capabilities, metadata storage, query rewrite capability, the ability to connect, via "connectors," to other services (whether local or remote), and an API (e.g., a representational state transfer API (Rest API)). The smart encryption system can also access and use other complementary services, such as distributed directory information services (e.g., via a Lightweight Directory Access Protocol (LDAP)), batch processing services, realtime analytics, data sharing services, web services, remote file storage, NoSQL database services, and RDBMs.

From a security operations ("SecOps") perspective, smart encryption systems and methods set forth herein can mitigate, reduce or eliminate threats of data breaches. Data can be encrypted in-flight, whether on-premises (e.g., of an implementer/user) or in the cloud. Privacy is maintained, with full ownership of key management and straightforward key rotation. From an information technology (IT) perspective, smart encryption systems and methods set forth herein can reduce operational costs by providing encryption support across multiple platforms and software applications (i.e., heterogeneous support), as well as comprehensive threat detection, within a single enterprise framework for data security and governance. From a business perspective, smart encryption systems and methods set forth herein can reduce risks associated with information loss, while satisfying privacy regulations.

Example Smart Encryption Application #1: Protecting Customer Financial Information In an example application, a financial services organization may use an analytical platform (e.g., using a cross-platform document-oriented database program, such as MongoDB) for performing Business Intelligence tasks and Decision Analysis. Data accessible via the analytical platform can include HIPAA-protected personally identifiable information (PII), personal health information (PHI) and/or financial information. The financial services organization may desire to protect this information, for both internal use (e.g., storage, application environments, user communities) and external use, and make the platform HIPAA-compliant.

A smart encryption system, as set forth herein, can be used to encrypt, and thus protect, all sensitive and critical data elements, such as customer ID, name, address, email, phone, birth date, account ID, policy information, and financial information, while ensuring HIPAA compliance, and satisfying GDPR and PCI DSS regulations. Data encryption can occur at a source location or centralized location, and then propagated throughout the organization (e.g., via a networked computer system) and/or to external organization. Once encrypted, the encrypted data elements can be deployed to a third party platform, if desired, for analytics (e.g., provider analytics). The smart encryption system can optionally be deployed in the cloud (e.g., MongoDB cloud). Users within the financial services organization would remain able to perform their daily work tasks as usual, while using the encrypted data.

Example Smart Encryption Application #2: Securing User Credentials

In an example application, a cloud services provider may desire to protect their user credentials (e.g., customer cloud credentials) within their platform. A smart encryption system, as set forth herein and including automated key rotation can be employed for this purpose.

Example Smart Encryption Application #3: Data Security in Marketing and Advertising In an example application, a digital marketing services agency may desire to mitigate risk associated with acquiring and storing PII data for its clients. In addition, the digital marketing services agency may desire to share its data sets between clients and/or with third parties without the risk of (or with reduced risk of) data loss. Smart encryption systems set forth herein, which facilitate the transfer and querying of data without decryption, can be employed for this purpose.

In another example application, a digital services provider that manages sweepstakes and loyalty programs for its clients may seek to migrate its platforms from local data centers to the cloud, while maintaining data security. The digital services provider may also seek to identify and filter out program "garners" (i.e., users who perpetrate scams or otherwise misuse the sweepstakes and/or loyalty programs). Smart encryption systems set forth herein, which facilitate anomaly detection and encryption of PII, can be employed for this purpose.

Example Smart Encryption Application #4: HIPAA-Compliance of Patient Data

In an example application, a healthcare services organization, providing cloud-based IT services for hospitals (e.g., to surgical departments thereof), may desire to store patient, procedural and/or diagnostic information in the cloud, while ensuring data security and compliance with HIPAA standards. Smart encryption systems set forth herein can be employed to protect patient PII and medical history information through its advanced encryption, while maintaining HIPAA and GDRR compliance.

Example Smart Encryption Application #5: Data Security in Loyalty Programs

In an example application, a provider of a consumer loyalty software platform that tracks customer purchasing activity for allocation and redemption of loyalty rewards may seek to ensure protection of sensitive customer data, for example to increase customer retention. Smart encryption systems set forth herein can be employed to protect customer PII and product and purchase information through its advanced encryption, while maintaining HIPAA and GDRR compliance.

Example Smart Encryption Application #6: Pharmaceutical Data Security

In an example application, a pharmaceutical company may seek to reduce their risk of data breach by deploying an enterprise-wide data security and differential privacy policy solution that is secure, flexible, and auditable, and that can be scaled up as their business grows. Smart encryption systems set forth herein can be employed to protect data while "in use," and to maintain HIPAA and GDRR compliance. For example, the smart encryption system can tag PII and/or PHI data attributes in every data source, and encrypt the tagged attributes prior to storage (e.g., in a relational database, a non-relational data store, a file system based repository, etc.). The differential privacy policies could then be enforced each time a data set is accessed and used.

In some embodiments, a smart encryption system includes security software that reduces or eliminates the threat of data theft by applying data encryption that works in all states of use (e.g., at rest, in use, in transit (e.g., movement or transmission), and/or during access).

In some embodiments, data is selected (e.g., by a user, via a graphical user interface (GUI)) for encryption, and in response to the selection, all selected data is encrypted. Queries can subsequently be executed against the encrypted data without decrypting the encrypted data. Result sets, generated as a result of the executed queries, are, in some implementations, only decrypted in response to a valid request. The validity of the request can be determined based on user permissions and/or keys. Threat and anomaly detections allows executions to be stopped and appropriate personnel alerted. The smart encryption system can maintain secure mapping metadata that is used for real time translation, facilitating selective encryption at the attribute level. Requests received from software applications can be translated and resolved in real time.

In some embodiments, an entire database schema, including tables and Objects, is encrypted (e.g., in response to a user selection), while maintaining a mapping of the encrypted data to the original schema, thereby protecting the entire schema and rendering the pre-encryption version of the data inaccessible (except by authorized viewers/users).

In some embodiments, a smart encryption system is configured to apply filtering to request received from software applications, such that only permitted operations are carried out. Filtering can be used to provide protection against malicious attempts by disabling certain actions to be executed.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements), etc.

The invention claimed is:

1. A method, comprising:
receiving, at a processor, a first query originating from a first software application and referencing encrypted data in a data store;
executing the first query without modification to the first software application from which the first query was received, via the processor, by retrieving a first set of ngram-matched portions of the encrypted data, thereby producing first query results including a first subset of the encrypted data;
sending, via the processor, the first query results to the first software application without decrypting the first subset of the encrypted data, for decryption at a first client;
receiving a second query, from a second software application, the second query having a second cross-database driver connectivity protocol different from a first cross-database driver connectivity protocol of the first query;
executing the second query, via the processor, by retrieving a second set of ngram-matched portions of the encrypted data, thereby producing second query results; and
sending, via the processor, the second query results to the second software application without decrypting the second subset of the encrypted data, for decryption at a second client different from the first client.

2. The method of claim 1, wherein the data store includes at least one of a relational database management system, a file system, a disk storage, or a web-based storage.

3. The method of claim 1, wherein at least one of the first query or the second query is a range query.

4. The method of claim 1, wherein the encrypted data includes encrypted data that has been encrypted using at least one of a deterministic encryption, an order-preserving encryption, or a numeric encryption.

5. The method of claim 1, wherein the causing the execution executing of the first query includes generating a token based on the first query originating from the first software application.

6. The method of claim 1, wherein the first query includes a custom match function call configured to search ngram cipher text.

7. A method, comprising:
receiving, at a processor, a first query originating from a first software application and referencing encrypted data in a data store from a plurality of data stores, the first software application running on a client compute device;
executing the first query without modification to the first software application from which the first query was received, via the processor, by searching for a first search pattern in ngram cipher text of the encrypted data, thereby identifying a first query result;
sending, via the processor, the first query result to the first software application without decrypting a subset of the encrypted data associated with the first query result, for decryption at the client compute device;
receiving, at the processor, a second query, from a second software application, the second query having a second cross-database driver connectivity protocol different from a first cross-database driver connectivity protocol of the first query;
executing the second query, by searching for a second search pattern in ngram cipher text of the encrypted data, thereby identifying a second query result; and
sending, via the processor, the second query result to the second software application without decrypting a subset of the encrypted data associated with the second query result, for decryption at the client compute device.

8. The method of claim 7, wherein the plurality of data stores includes at least one of a relational database management system, a file system, a disk storage, or a web-based storage.

9. The method of claim 7, wherein the encrypted data includes encrypted data that has been encrypted using at least one of a deterministic encryption, an order-preserving encryption, or a numeric encryption.

10. The method of claim 7, wherein the causing the execution executing of the first query includes generating a token based on the first query originating from the first software application.

11. The method of claim 7, wherein at least one of the first query or the second query includes a custom match function call configured to search ngram cipher text.

12. A non-transitory, processor-readable medium storing processor-readable instructions to cause a processor to:
receive a first query originating from a first software application and referencing encrypted data in a data store;
execute the first query, without modification to the first software application from which the first query was received, by retrieving a first set of ngram-matched portions of the encrypted data, thereby producing first query results including a first subset of the encrypted data;

send the first query results to the first software application without decrypting the first subset of the encrypted data, for decryption at a first client;

receive a second query from a second software application, the second query having a second cross-database driver connectivity protocol different from a first cross-database driver connectivity protocol associated with the first query;

execute the second query by retrieving a second set of ngram-matched portions of the encrypted data, thereby producing second query results; and send the second query results to the second software application without decrypting the second subset of the encrypted data, for decryption at a second client.

13. The non-transitory, processor-readable medium of claim 12, wherein the data store includes at least one of a relational database management system, a file system, a disk storage, or a web-based storage.

14. The non-transitory, processor-readable medium of claim 12, wherein at least one of the first query or the second query includes a custom match function call configured to search ngram cipher text.

15. A non-transitory, processor-readable medium storing processor-readable instructions to cause a processor to:

receive a first query originating from a first software application and referencing encrypted data in a data store from a plurality of data stores, the first software application running on a client compute device;

execute the first query without modification to the first software application from which the first query was received, by searching for a first search pattern in ngram cipher text of the encrypted data, thereby identifying a first query result including a first subset of the encrypted data;

send the first query result to the first software application without decrypting the first subset of the encrypted data, for decryption at the client compute device;

receive a second query from a second software application, the second query having a second cross-database driver connectivity protocol different from a first cross-database driver connectivity protocol of the first query;

execute the second query, by searching for a second search pattern in ngram cipher text of the encrypted data, thereby identifying a second query result including a second subset of the encrypted data; and send, via the processor, the second query result to the second software application without decrypting the second subset of the encrypted data, for decryption at the client compute device.

16. The non-transitory, processor-readable medium of claim 15, wherein the data store includes at least one of a relational database management system, a file system, a disk storage, or a web-based storage.

* * * * *